US009793047B2

(12) United States Patent
Hatanaka et al.

(10) Patent No.: US 9,793,047 B2
(45) Date of Patent: Oct. 17, 2017

(54) METHOD OF FORMING ELECTROMAGNETIC SPACE

(71) Applicant: NITTO DENKO CORPORATION, Ibaraki-shi, Osaka (JP)

(72) Inventors: Takezo Hatanaka, Ibaraki (JP); Masami Inoue, Ibaraki (JP); Hisashi Tsuda, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 399 days.

(21) Appl. No.: 14/123,143

(22) PCT Filed: May 1, 2013

(86) PCT No.: PCT/JP2013/062699
§ 371 (c)(1),
(2) Date: Nov. 29, 2013

(87) PCT Pub. No.: WO2014/087685
PCT Pub. Date: Jun. 12, 2014

(65) Prior Publication Data
US 2014/0325830 A1 Nov. 6, 2014

(30) Foreign Application Priority Data
Dec. 7, 2012 (JP) .................................. 2012-268650

(51) Int. Cl.
*H04R 31/00* (2006.01)
*H01F 41/04* (2006.01)
(Continued)

(52) U.S. Cl.
CPC .............. *H01F 41/04* (2013.01); *H02J 50/12* (2016.02); *H02J 50/70* (2016.02); *H04B 5/0037* (2013.01);
(Continued)

(58) Field of Classification Search
CPC H01F 38/14; H01F 41/04; H02J 7/025; H02J 17/00; H04B 5/0075; H04B 5/0037;
(Continued)

(56) References Cited

U.S. PATENT DOCUMENTS

2010/0244578 A1 9/2010 Yoshikawa
2010/0244580 A1 9/2010 Uchida et al.
(Continued)

FOREIGN PATENT DOCUMENTS

JP 2003-079075 A 3/2003
JP A-2010-239769 10/2010
(Continued)

OTHER PUBLICATIONS

Feb. 17, 2015 Office Action issued in Singapore Patent Application No. 2013088935.
(Continued)

*Primary Examiner* — Paul D Kim
(74) *Attorney, Agent, or Firm* — Oliff PLC

(57) ABSTRACT

By supplying power from the power-supplying resonator to the power-receiving resonator by means of resonance, an electromagnetic space having a relatively low magnetic field strength is formed between the power-supplying resonator and the power-receiving resonator. In so doing, the position where the electromagnetic space is formed is changed by setting the frequency of the AC power supplied from an AC power source to the power-supplying module to an antiphase resonance mode or an inphase resonance mode, and the size of the electromagnetic space is changed by changing the distance between the power-supplying coil and the power-supplying resonator and the distance between the power-receiving resonator and the power-receiving coil.

12 Claims, 18 Drawing Sheets

(51) Int. Cl.
  *H04B 5/00* (2006.01)
  *H02J 50/12* (2016.01)
  *H02J 50/70* (2016.01)
  *H02J 17/00* (2006.01)
  *H02J 7/02* (2016.01)
  *H01F 38/14* (2006.01)

(52) U.S. Cl.
  CPC ............ *H04B 5/0075* (2013.01); *H01F 38/14* (2013.01); *H02J 7/025* (2013.01); *H02J 17/00* (2013.01); *Y10T 29/4902* (2015.01)

(58) Field of Classification Search
  CPC ......... Y10T 29/49002; Y10T 29/49005; Y10T 29/49007; Y10T 29/4902; Y10T 29/49071; Y10T 29/490732; Y10T 29/4908
  USPC ............ 29/592.1, 594, 595, 605–607, 609.1; 307/9.1, 104
  See application file for complete search history.

(56) References Cited

U.S. PATENT DOCUMENTS

| | | | |
|---|---|---|---|
| 2010/0244839 A1 | 9/2010 | Yoshikawa | |
| 2011/0101792 A1 | 5/2011 | Koumoto | |
| 2011/0254378 A1 | 10/2011 | Ichikawa et al. | |
| 2012/0007439 A1 | 1/2012 | Kozakai et al. | |
| 2012/0223594 A1* | 9/2012 | Gotani | H01F 38/14 307/104 |
| 2012/0256494 A1 | 10/2012 | Kesler et al. | |
| 2012/0326499 A1* | 12/2012 | Ichikawa | B60L 11/182 307/9.1 |
| 2013/0300359 A1 | 11/2013 | Nakamura et al. | |
| 2014/0246919 A1* | 9/2014 | Hatanaka | H01F 38/14 307/104 |
| 2015/0311742 A1* | 10/2015 | Hatanaka | H01M 10/46 320/108 |

FOREIGN PATENT DOCUMENTS

| | | |
|---|---|---|
| JP | A-2010-239838 | 10/2010 |
| JP | A-2010-239847 | 10/2010 |
| JP | 2011-048794 A | 3/2011 |
| JP | A-2011-147213 | 7/2011 |
| JP | 2012-019648 A | 1/2012 |
| JP | 2012-191697 A | 10/2012 |
| TW | 201002549 A | 1/2010 |
| WO | 2010/001540 A1 | 1/2010 |
| WO | 2010/041321 A1 | 4/2010 |
| WO | WO 2011/086445 A2 | 7/2011 |
| WO | 2012/105040 A1 | 8/2012 |

OTHER PUBLICATIONS

Nov. 5, 2014 Extended European Search Report issued in European Application No. 13801967.4.
International Search Report issued in International Patent Application No. PCT/JP2013/062699 dated Jun. 4, 2013.
Jun. 9, 2015 International Preliminary Report on Patentability issued in International Application No. PCT/JP2013/062699.
Mar. 11, 2016 Office Action issued in European Patent Application No. 13801967.4.
Jun. 21, 2016 Office Action issued in Japanese Application No. 2012-268650.
Aug. 17, 2016 Office Action issued in European Application No. 13801967.4.
Mar. 8, 2016 Office Action issued in Japanese Patent Application No. 2012-268650.
Imura Takehiro "Transmission Technology by Electromagnetic Field Resonance Coupling" The Journal of the Institute of Electrical Engineers of Japan; Jul. 1, 2009; vol. 129; No. 7; pp. 414-417.
Imura, Takehiro "Transmission Technology by Electromagnetic Field Resonance Coupling" Wireless Energy, Forefront of Transmission Technology; Japan; Takashi Yoshida; Feb. 14, 2011; pp. 17-30.
Hirayama, Yutaka "Equivalent Circuit for Resonance Wireless Power Transmission" Wireless Energy, Forefront of Transmission Technology; Japan; Takashi Yoshida; Feb. 14, 2011; pp. 68-80.
Dec. 9, 2016 Office Action issued in Korean Patent Application No. 10-2013-7031425.
Dec. 23, 2016 Office Action issued in Chinese Patent Application No. 201380001942.5.
Jan. 4, 2017 Office Action issued in Taiwanese Patent Application No. 102115793.
Nov. 9, 2016 Extended European Search Report issued in European Patent Application No. 16001728.1.

* cited by examiner

FIG. 11

| | DISTANCE A AND DISTANCE B [mm] | POWER TRANSMISSION EFFICIENCY [%] | | | | | | | |
|---|---|---|---|---|---|---|---|---|---|
| | | WITHOUT ALUMINUM FOIL $\eta_o$ | WITH ALUMINUM FOIL $\eta_m$ | | | | | | |
| | | | DIAMETER 46mm φ | $\Delta\eta$ | DIAMETER 55mm φ | $\Delta\eta$ | DIAMETER 60mm φ | $\Delta\eta$ |
| EXAMPLE 8 | 5 | 78.2 | 78.1 | 0.1 | 77.5 | 0.7 | 77.3 | 0.9 |
| EXAMPLE 9 | 10 | 70.4 | 70.2 | 0.2 | 69.0 | 1.4 | 68.8 | 1.6 |
| EXAMPLE 10 | 15 | 51.5 | 51.0 | 0.5 | 49.7 | 1.8 | 49.5 | 2.0 |
| EXAMPLE 11 | 20 | 42.3 | 41.6 | 0.7 | 40.3 | 2.0 | 40.1 | 2.2 |

$\Delta\eta = \eta_o - \eta_m$
$\eta_o$ : POWER TRANSMISSION EFFICIENCY WITHOUT ALUMINUM FOIL
$\eta_m$ : POWER TRANSMISSION EFFICIENCY WITH ALUMINUM FOIL FIG. 16
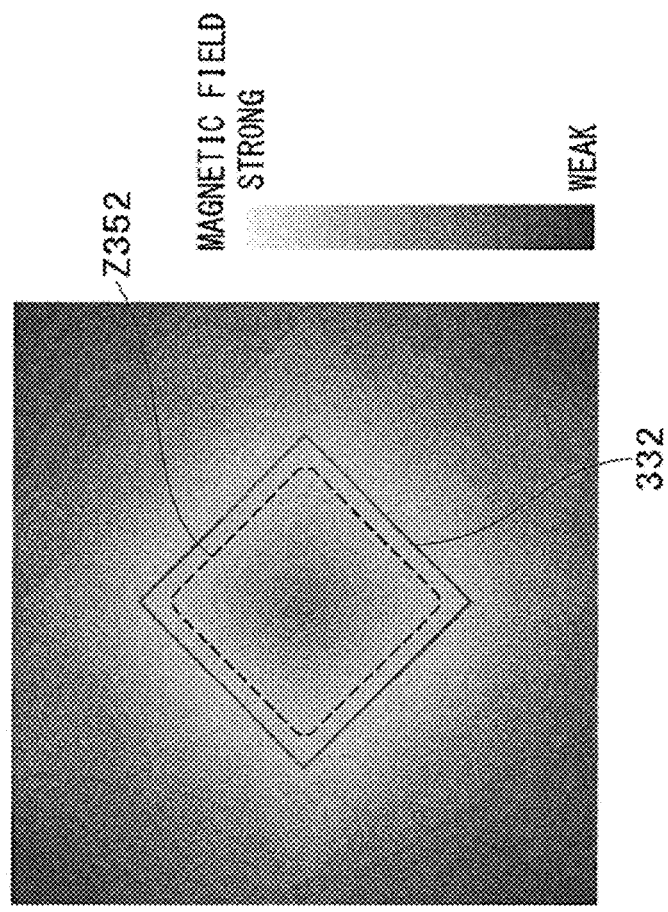
(B) ANTIPHASE RESONANCE MODE
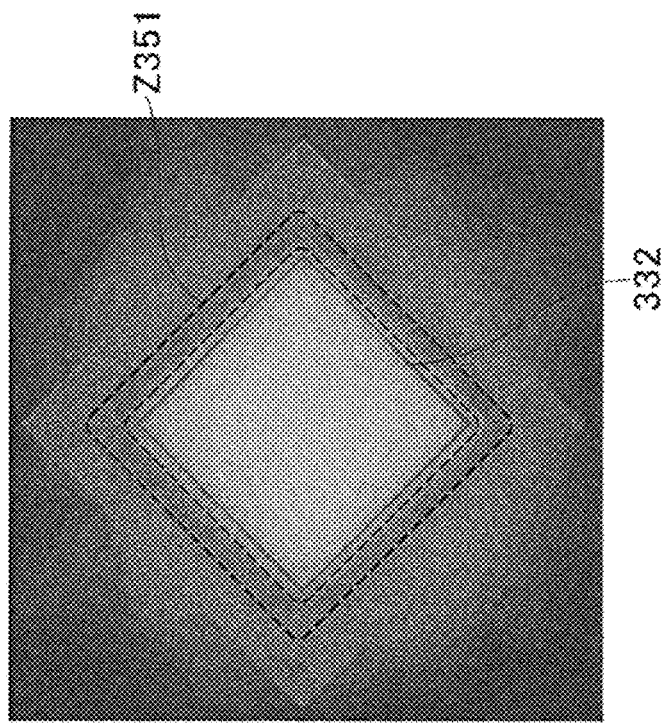
(A) INPHASE RESONANCE MODE

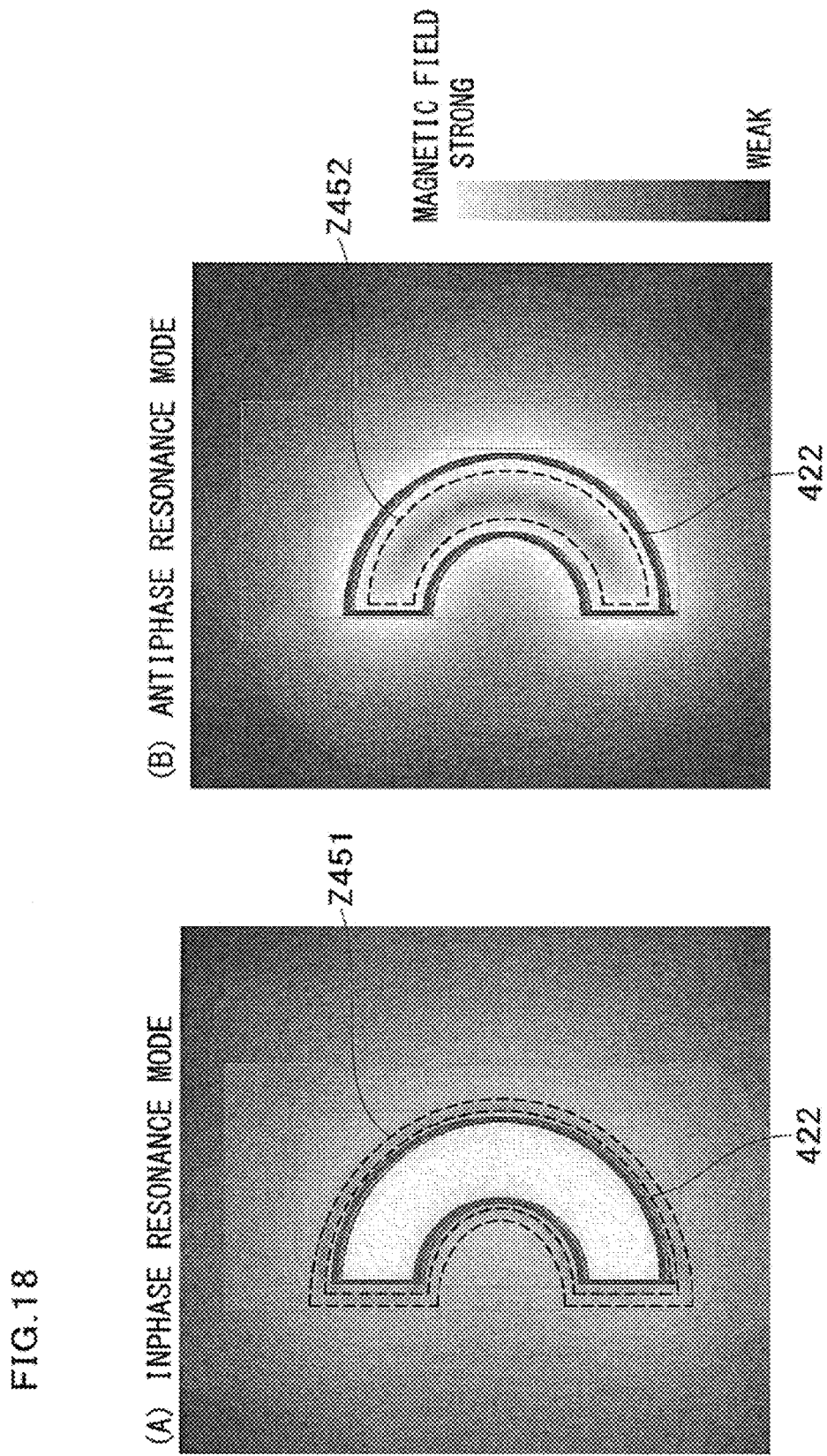

METHOD OF FORMING ELECTROMAGNETIC SPACE

TECHNICAL FIELD

The present invention relates to a method of forming an electromagnetic space having a relatively low magnetic field strength.

BACKGROUND ART

Electronic devices such as laptop PCs, tablet PCs, digital cameras, and mobile phones, which are portable while being used by the user are rapidly increasing in recent years. Many of these electronic devices have therein a rechargeable battery, which requires periodical charging. To facilitate the work for charging the rechargeable battery of an electronic device, there are an increasing number of devices for charging rechargeable batteries by using a power-supplying technology (wireless power transmission technology) that performs wireless power transmission between a power-supplying device and a power-receiving device mounted in an electronic device.

Examples of such a wireless power transmission technology includes a technology that performs power transmission by means of resonance phenomena between resonators provided to the power-supplying device and the power-receiving device (e.g. see PTL 1).

According to the above-described wireless power transmission technology, a magnetic field is generated in the vicinity of the resonators of the power-supplying device and the power-receiving device, when the resonator are resonated with each other. Consequently, an eddy current occurs due to the magnetic field in a power-supplying device, a rectifier provided inside or outside the power-receiving device, a rechargeable battery, or another electronic device and heat is generated therefrom, with the result that an adverse effect may occur in the rectifier, the rechargeable battery, or the electronic device.

To solve the above-described problem caused by the magnetic field, for example, PTL 2 recites a power transmission system which is able to reduce the leaked magnetic field in a power-supplying device when power transmission is conducted through contactless power supply. Furthermore, PTL 3 recites a power transceiving device which is able to reduce the magnetic field between a power-supplying coil and a power-receiving coil.

CITATION LIST

Patent Literatures

PTL 1: Japanese Unexamined Patent Publication No. 239769/2010
PTL 2: Japanese Unexamined Patent Publication No. 147213/2011
PTL 3: Japanese Unexamined Patent Publication No. 239847/2010

SUMMARY OF THE INVENTION

Technical Problem

PTL 2 reciting the power transmission system and PTL 3 reciting the power transceiving device, however, do not mention the intentional formation of an electromagnetic space having a low magnetic field strength. Furthermore, these patent literatures fail to recite where, in what size, and in what shape the electromagnetic space having a low magnetic field strength is formed in consideration of the positions, sizes or the like of a rectifier, a rechargeable battery, and another electronic device in the power-supplying device or the power-receiving device.

An object of the present invention is therefore to provide a method of forming an electromagnetic space, with which an electromagnetic space having a low magnetic field strength is intentionally formed between a coil of a power-supplying module and a coil of a power-receiving module while the position, size, and shape of the formed electromagnetic space having the low magnetic field strength are controllable.

Technical Solution

An aspect of the present invention to solve the problem above is a method of forming an electromagnetic space, including the step of, when power is supplied from coils of a power-supplying module to coils of a power-receiving module by means of resonance, forming, at a desired position between the coils of the power-supplying module and the coils of the power-receiving module, an electromagnetic space having a magnetic field strength lower than a magnetic field strength of a position other than the desired position.

According to the method above, as the power is supplied from the coils of the power-supplying module to the coils of the power-receiving module by means of resonance, at a desired position between the coils of the power-supplying module and the coils of the power-receiving module, an electromagnetic space having a magnetic field strength lower than a magnetic field strength of a position other than the desired position is formed.

Another aspect of the invention for solving the problem above is a method of forming an electromagnetic space, in which the coils of the power-supplying module and the coils of the power-receiving module are disposed in proximity to each other to the extent that, at the desired position between the coils of the power-supplying module and the coils of the power-receiving module, the electromagnetic space having the magnetic field strength lower than the magnetic field strength of the position other than the desired position is formed, as a magnetic field generated around the coils of the power-supplying module and a magnetic field generated around the coils of the power-receiving module cancel each other out.

According to the method above, when the power is supplied from the coils of the power-supplying module to the coils of the power-receiving module by means of resonance, the coils of the power-supplying module and the coils of the power-receiving module are disposed in proximity to each other so that, at the desired position between the coils of the power-supplying module and the coils of the power-receiving module, the electromagnetic space having the magnetic field strength lower than the magnetic field strength of the position other than the desired position is formed, as a magnetic field generated around the coils of the power-supplying module and a magnetic field generated around the coils of the power-receiving module cancel each other out.

Another aspect of the invention for solving the problem above is the above-described method which is further arranged so that, when the power is supplied from the coils of the power-supplying module to the coils of the power-receiving module by means of the resonance, the frequency of the power supplied to the coils of the power-supplying module is arranged so that a current in the coils of the power-supplying module and a current in the coils of the power-receiving module flow in opposite directions.

According to the method above, as the coils of the power-supplying module and the coils of the power-receiving module are disposed in proximity to each other, the coupling coefficient indicating the degree of coupling between the coils of the power-supplying module and the coils of the power-receiving module is increased when power transmission utilizing resonance is conducted. When a transmission characteristic "S21" (which is an index of the power transmission efficiency in the power transmission from the coils of the power-supplying module to the coils of the power-receiving module) is measured while the coupling coefficient is high as above, the measured waveform of the transmission characteristic "S21" has separate peaks; one on a low frequency side and another on a high frequency side. By setting the frequency of the power supplied to the coils of the power-supplying module to the frequency nearby the peak on the high frequency side, the current in the coils of the power-supplying module and the current in the coils of the power-receiving module flow in opposite directions. With this, as the magnetic field generated on the inner circumference side of the coils of the power-supplying module and the magnetic field generated on the inner circumference side of the coils of the power-receiving module cancel each other out, the influence on the magnetic fields on the inner circumference sides of the coils of the power-supplying module and the coils of the power-receiving module is restrained, and the electromagnetic space having a smaller magnetic field strength than a magnetic field strength in positions other than the inner circumference sides of the coils of the power-supplying module and the coils of the power-receiving module.

Another aspect of the invention for solving the problem above is the above-described method which is further arranged so that, when the power is supplied from the coils of the power-supplying module to the coils of the power-receiving module by means of the resonance, the frequency of the power supplied to the coils of the power-supplying module is arranged so that a current in the coils of the power-supplying module and a current in the coil of the power-receiving module flow in the same direction.

According to the method above, as the coils of the power-supplying module and the coils of the power-receiving module are disposed in proximity to each other, the coupling coefficient indicating the degree of coupling between the coils of the power-supplying module and the coils of the power-receiving module is increased when power transmission utilizing resonance is conducted. When a transmission characteristic "S21" (which is an index of the power transmission efficiency in the power transmission from the coils of the power-supplying module to the coils of the power-receiving module) is measured while the coupling coefficient is high as above, the measured waveform of the transmission characteristic "S21" has separate peaks; one on a low frequency side and another on a high frequency side. By setting the frequency of the power supplied to the coils of the power-supplying module to the frequency nearby the peak on the low frequency side, the current in the coils of the power-supplying module and the current in the coils of the power-receiving module flow in the same direction. With this, as the magnetic field generated on the outer circumference side of the coils of the power-supplying module and the magnetic field generated on the outer circumference side of the coils of the power-receiving module cancel each other out, the influence on the magnetic fields on the outer circumference sides of the coils of the power-supplying module and the coils of the power-receiving module is restrained, and the electromagnetic space having a smaller magnetic field strength than a magnetic field strength in positions other than the outer circumference sides of the coils of the power-supplying module and the coils of the power-receiving module.

Another aspect of the invention for solving the problem above is the above-described method which is further arranged so that, the size of the electromagnetic space is changed by changing the degree of magnetic field coupling between the coils of the power-supplying module and the coils of the power-receiving module by changing an adjustable parameter of the coils of the power-supplying module and the coils of the power-receiving module.

According to the method above, the size of the electromagnetic space is changed by changing the degree of magnetic field coupling between the coils of the power-supplying module and the coils of the power-receiving module by changing an adjustable parameter of the coils of the power-supplying module and the coils of the power-receiving module. For example, the size of the electromagnetic space is increased by relatively decreasing the magnetic field coupling between the coils of the power-supplying module and the coils of the power-receiving module. On the other hand, the size of the electromagnetic space is decreased by relatively increasing the magnetic field coupling between the coils of the power-supplying module and the coils of the power-receiving module.

Another aspect of the invention for solving the problem above is the above-described method which is further arranged so that, the adjustable parameter indicates a positional relationship of the coils of the power-supplying module and a positional relationship of the coils of the power-receiving module.

According to the method above, by changing the positional relationship of the coils of the power-supplying module and the positional relationship of the coils of the power-receiving module, the degree of the magnetic field coupling between the coils of the power-supplying module and the coils of the power-receiving module is changed, with the result that the size of the electromagnetic space is changed.

Another aspect of the invention for solving the problem above is the above-described method which is further arranged so that, the adjustable parameter indicates the shapes of the coils of the power-supplying module and the shapes of the coils of the power-receiving module, and the shape of the electromagnetic space is desirably changed, by changing the shape of each coil so that the degree of the magnetic field coupling between and around the coils of the power-supplying module and the coils of the power-receiving module is changed.

According to the method above, by desirably shaping the coils of the power-supplying module and the coils of the power-receiving module, it is possible to form an electromagnetic space having a relatively low magnetic field strength with a desired shape corresponding to the shapes of the coils. In other words, it is possible to change (control) the shape of an electromagnetic space having a relatively low magnetic field strength by changing the shapes of the coils of the power-supplying module and the coils of the power-receiving module.

Another aspect of the invention for solving the problem above is the above-described method which is further arranged so that, the coils of the power-supplying module are a power-supplying coil and a power-supplying resonator, the coils of the power-receiving module are a power-receiving coil and a power-receiving resonator, and when the power supplied to the power-supplying coil is supplied to the power-supplying resonator by electromagnetic induction, the power supplied to the power-supplying resonator is, as magnetic field energy, transmitted from the power-supplying resonator to the power-receiving resonator by means of resonance of the power-supplying resonator and the power-receiving resonator, and the power supplied to the power-receiving resonator is supplied to the power-receiving coil by electromagnetic induction, the size of the electromagnetic space is changed, by changing the adjustable parameters of the power-supplying coil, the power-supplying resonator, the power-receiving coil, and the power-receiving resonator so as to change the degree of the magnetic field coupling between the power-supplying resonator and the power-receiving resonator.

According to the method above, when wireless power transmission utilizing the magnetic field resonant state is conducted, the size of the electromagnetic space is changeable by changing the degree of the magnetic field coupling by changing the adjustable parameters regarding the power-supplying coil, the power-supplying resonator, the power-receiving coil, and the power-receiving resonator.

Another aspect of the invention for solving the problem above is the above-described method which is further arranged so that, the adjustable parameter is at least one of the first distance between the power-supplying coil and the power-supplying resonator and the second distance between the power-receiving resonator and the power-receiving coil.

According to the method above, when wireless power transmission utilizing the magnetic field resonant state is conducted, the size of the electromagnetic space is changeable by changing the degree of the magnetic field coupling by changing at least one of the first distance between the power-supplying coil and the power-supplying resonator and the second distance between the power-receiving resonator and the power-receiving coil. For example, the size of the electromagnetic space is increased by relatively decreasing the magnetic field coupling by relatively shortening the first distance between the power-supplying coil and the power-supplying resonator and the second distance between the power-receiving resonator and the power-receiving coil. On the other hand, the size of the electromagnetic space is decreased by relatively increasing the magnetic field coupling by relatively elongating the first distance between the power-supplying coil and the power-supplying resonator and the second distance between the power-receiving resonator and the power-receiving coil.

Advantageous Effects

It is possible to provide a method of forming an electromagnetic space, with which an electromagnetic space having a low magnetic field strength is intentionally formed between a coil of a power-supplying module and a coil of a power-receiving module while the position, size, and shape of the formed electromagnetic space having the low magnetic field strength are controllable.

BRIEF DESCRIPTION OF THE DRAWINGS

FIG. 11 shows measurement results of the power transmission efficiency $\eta 0$ with no aluminum foil, the power transmission efficiencies $\eta m$ when three types of circular aluminum foils (diameters: 46 mm, 55 mm, and 60 mm) are inserted, and differences $\Delta \eta$ between the power transmission efficiencies, in the examples 8 to 11.

FIG. 16 illustrates the magnetic field strength distribution in the example 2, when the shape of the electromagnetic space is changed.

FIG. 18 illustrates the magnetic field strength distribution in the example 3, when the shape of the electromagnetic space is changed.

DESCRIPTION OF EMBODIMENTS

The following will describe a method of forming an electromagnetic space in the present invention, with reference to examples and an embodiment.

(Outline)

Figure 1:
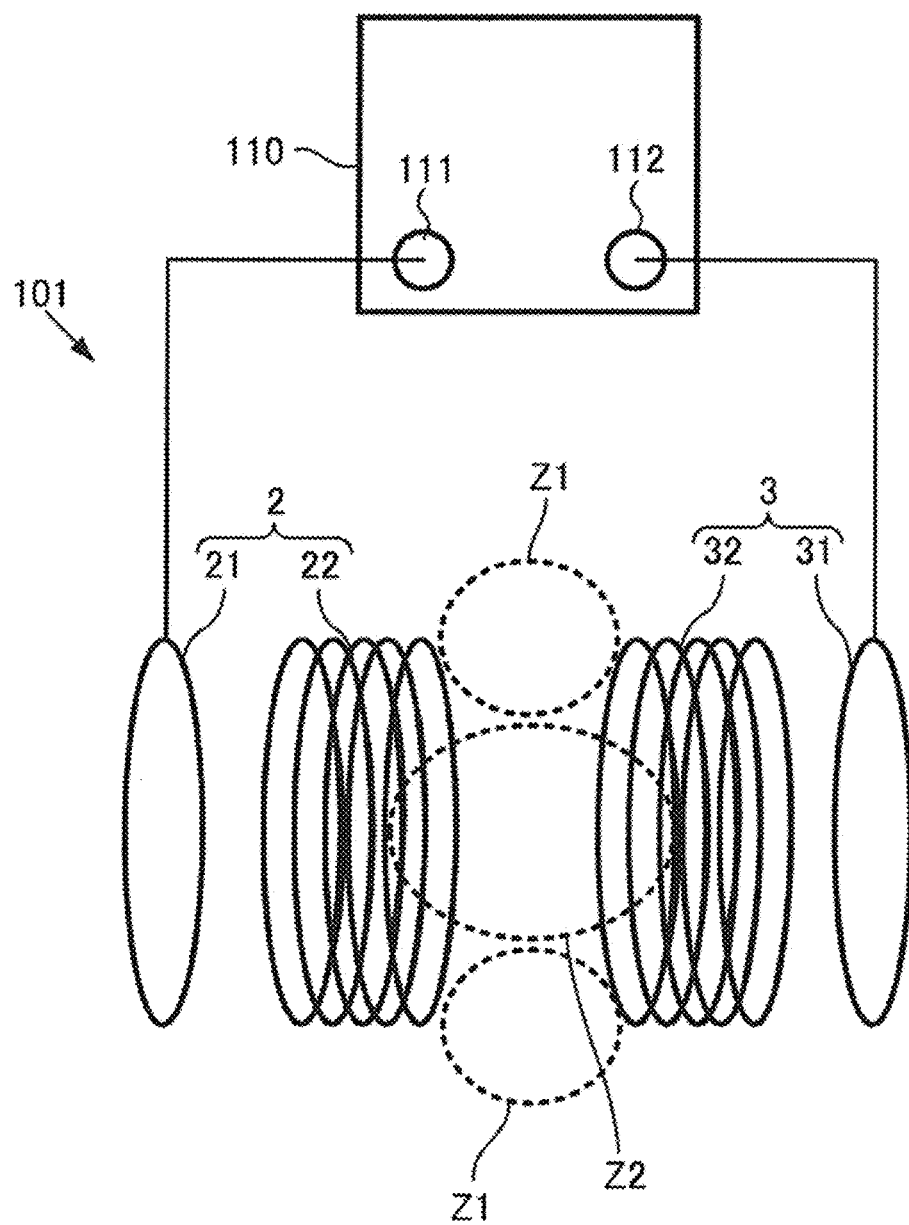
FIG. 1 is a schematic explanatory diagram of a method of forming an electromagnetic space.

The method of forming an electromagnetic space in the present invention is achieved by, for example, a wireless power transmission system 101 shown in FIG. 1. As main components, the wireless power transmission system 101 includes a power-supplying module 2 having a power-supplying coil 21 and a power-supplying resonator 22 and a power-receiving module 3 having a power-receiving coil 31 and a power-receiving resonator 32. Further, the power-supplying coil 21 of the power-supplying module 2 and a later-described output terminal 111 of a network analyzer 110 are connected by wiring and are therefore capable of outputting AC power of any frequency from the output terminal 111 to the power-supplying coil 21. The power-receiving coil 31 of the power-receiving module 3 and an input terminal 112 of the network analyzer 110 are connected by wiring so as to enable measurement of the power input to from the power-receiving coil 31 to the input terminal 112. As the power is supplied from the power-supplying resonator 22 of the power-supplying module 2 to the power-receiving resonator 32 of the power-receiving module 3 by utilizing resonance, electromagnetic spaces Z1 and Z2 are formed at desired positions between the power-supplying resonator 22 and the power-receiving resonator 32. These electromagnetic spaces Z1 and Z2 have magnetic field strengths lower than the magnetic field strengths at positions other than the desired positions.

The power-supplying resonator 22 and the power-receiving resonator 32 are each a resonator using a coil. Examples of such a resonator includes a spiral coil, a solenoid coil, and a loop coil. Further, the "resonance" is a phenomenon in which two or more coils are tuned to a resonance frequency. As detailed later, the desired positions locate on the inner circumference side or on the outer circumference side of the coil (power-supplying resonator 22) of the power-supplying module 2 or the coil (power-receiving resonator 32) of the power-receiving module 3.

EXAMPLES

Now, the electromagnetic spaces Z1 and Z2 which are formed by the wireless power transmission system 101 and have low magnetic field strengths will be described based on the result of the actual measurement of the magnetic field strengths.
(Structure of Wireless Power Transmission System 101)

Figure 2:
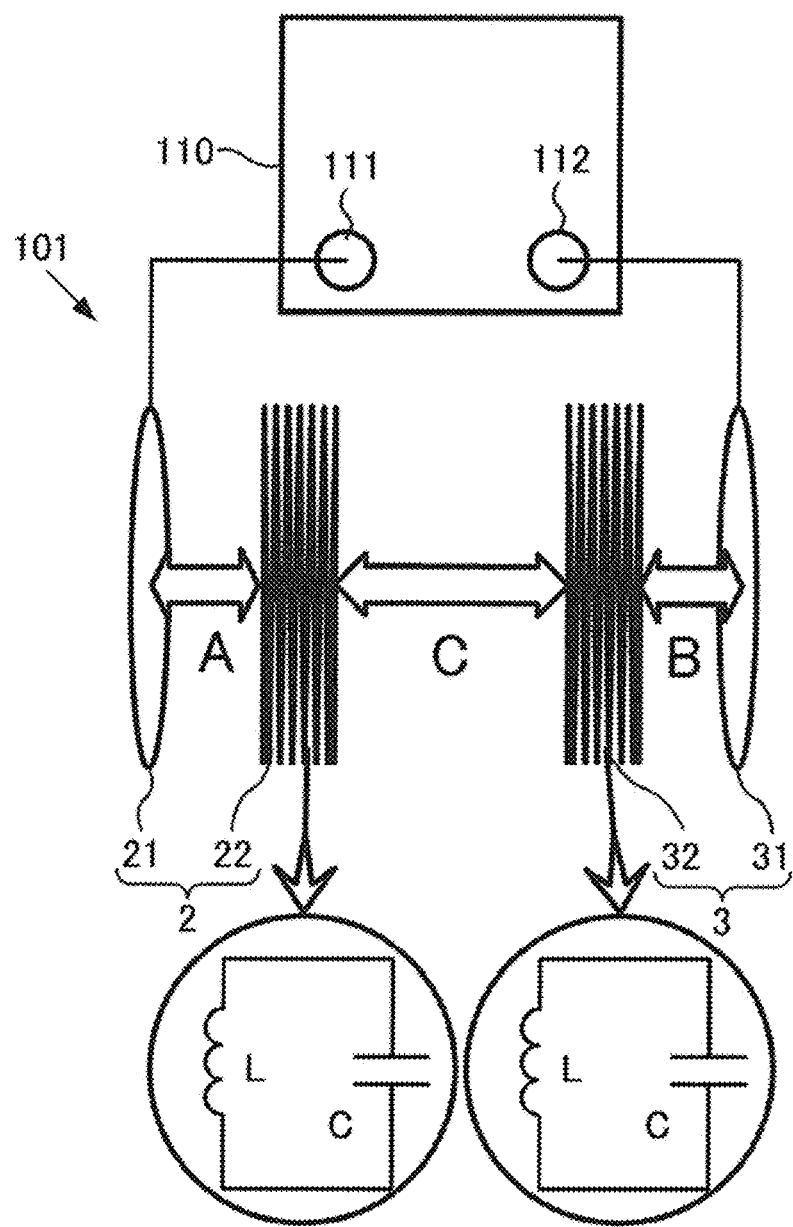
FIG. 2 shows the structure of a wireless power transmission system of examples.

As shown in FIG. 2, the wireless power transmission system 101 used in the example includes: a power-supplying module 2 having a power-supplying coil 21 and a power-supplying resonator 22; and a power-receiving module 3 having a power-receiving coil 31 and a power-receiving resonator 32. To the power-supplying coil 21 is connected an output terminal ill of a network analyzer 110 (produced by Agilent Technologies, Inc.). To the power-receiving coil 31 is connected an input terminal 112 of the network analyzer 110. When power is supplied to the power-supplying module 2 in the wireless power transmission system 101 with the above-described structure, the power is supplied as magnetic field energy from the power-supplying resonator 22 to the power-receiving resonator 32 by means of resonance.

The network analyzer 110 is capable of outputting from its output terminal 111 AC power of any given frequency to the power-supplying coil 21. The network analyzer 110 is also capable of measuring the power input from the power-receiving coil 31 to the input terminal 112. Further, the network analyzer 110 is also capable of measuring the transmission characteristic "S21" shown in FIG. 3 and the power transmission efficiency shown in FIGS. 11 and 12, as detailed later.

The power-supplying coil 21 plays a role of supplying the power obtained from the network analyzer 110 to the power-supplying resonator 22 by means of electromagnetic induction. The power-supplying coil. 21 is formed by winding once a copper wire material (coated by insulation film) having a wire diameter of 1 mmϕ, and its coil diameter is set to 80 mmϕ.

The power-receiving coil 31 plays a role of outputting, to the input terminal 112 of the network analyzer 110, the power having been transmitted as a magnetic field energy from the power-supplying resonator 22 to the power-receiving resonator 32, by means of electromagnetic induction. This power-receiving coil 31, as in the case of the power-supplying coil 21, is formed by winding once a copper wire material (coated by insulation film) having a wire diameter of 1 mmϕ, and its coil diameter is set to 80 mmϕ.

The power-supplying resonator 22 and the power-receiving resonator 32 are each an LC resonance circuit and play a role of creating a magnetic field resonant state. In this example, the capacitor component of the LC resonance circuit is realized in the form of an element. However, the capacitor component may be a stray capacitance realized by making the both ends of the coil open. In this LC resonance circuit, the resonance frequency is f which is derived from (formula 1) below, where the inductance is L and the capacity of capacitor is C.

$$f=1/(2\pi\sqrt{(LC)})$$ (formula 1)

The power-supplying resonator 22 and the power-receiving resonator 32 are each a solenoid coil formed by winding four times a copper wire material (coated by insulation film) having a wire diameter of 1 mmϕ, with its coil diameter being 80 mmϕ. The resonance frequency of the power-supplying resonator 22 and the power-receiving resonator 32 is set to 15.3 MHz As described above, when the resonance frequency of the power-supplying resonator 22 and the resonance frequency of the power-receiving resonator 32 are made identical (i.e., resonate with each other), a magnetic field resonant state is created between the power-supplying resonator 22 and the power-receiving resonator 32. When a magnetic field resonant state is created between the power-supplying resonator 22 and the power-receiving resonator 32 by having these resonators resonating with each other, power is transmitted from the power-supplying resonator 22 to the power-receiving resonator 32 as magnetic field energy.

In regard to the above, the distance between the power-supplying coil 21 and the power-supplying resonator 22 is denoted as A, the distance between the power-receiving coil 31 and the power-receiving resonator 32 is denoted as B, and the distance between the power-supplying resonator 22 and the power-receiving resonator 32 is denoted as C (see FIG. 2).
(Positions where Electromagnetic Spaces Z are Formed)

Now, the following will describe positions where electromagnetic spaces Z are formed by utilizing a wireless power transmission system 101 connected to the above-described network analyzer 110. The distance A between the power-supplying coil 21 and the power-supplying resonator 22 is set to 15 mm, the distance B between the power-receiving coil 31 and the power-receiving resonator 32 is set to 1.5 mm, and the distance C between the power-supplying resonator 22 and the power-receiving resonator 32 is set to 30 mm. Note that, an electromagnetic space Z is analyzed by an electromagnetic field analysis and magnetic field strengths are indicated in different color tones.

First, using the network analyzer 110, the transmission characteristic "S21" is measured at various frequencies of the AC power supplied to the wireless power transmission system 101. In this regard, as shown in the graph of FIG. 3, the horizontal axis indicates the frequency of the AC power output from the output terminal 111, and the vertical axis indicates the transmission characteristic "S21".

The transmission characteristic "S21" is indicated in units of decibel and indicates signals out of those from the output terminal. 111 having passed the input terminal 112. Therefore, the higher the value, the higher the power transmission efficiency is. Further, the power transmission efficiency means a ratio of the power output to the input terminal 112 for the power supplied from the output terminal 111 to the power-supplying module 2, while the wireless power transmission system 101 is connected to the network analyzer 110. In other words, the higher the transmission characteristic "S21" is, the higher the power transmission efficiency is.

Figure 3:
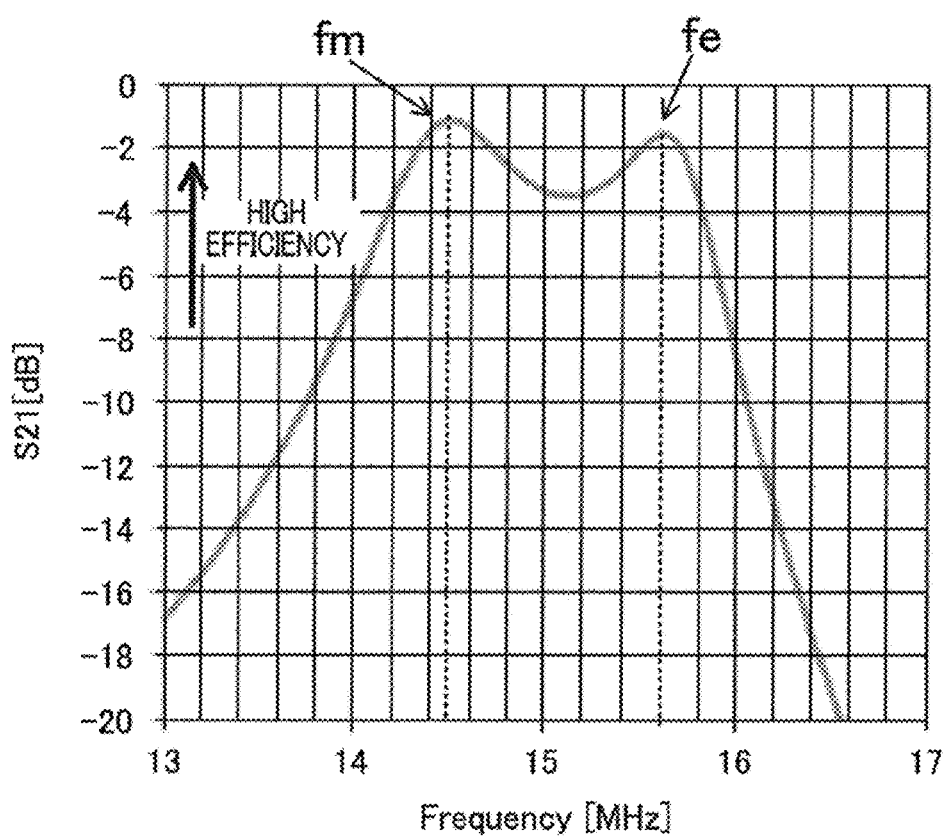
FIG. 3 is a graph showing a measurement result of a transmission characteristic S21 when the frequency of power supplied to the wireless power transmission system is changed.

The measured waveform of the transmission characteristic "S21" has separate peaks; one on a low frequency side and another on a high frequency side, as shown in FIG. 3. Of the separate peaks, the frequency on the high frequency side is indicated as fe, and the frequency on the low frequency side is indicated as fm.

In this example, the distance C between the power-supplying resonator 22 and the power-receiving resonator 32 is set at 30 mm. In this regard, the distance C may be differently set on condition that the power-supplying resonator 22 and the power-receiving resonator 32 are provided in proximity to each other to the extent that the measured waveform of the transmission characteristic "S21" has separate peaks; one on a low frequency side and another on a high frequency side.

Figure 4A:
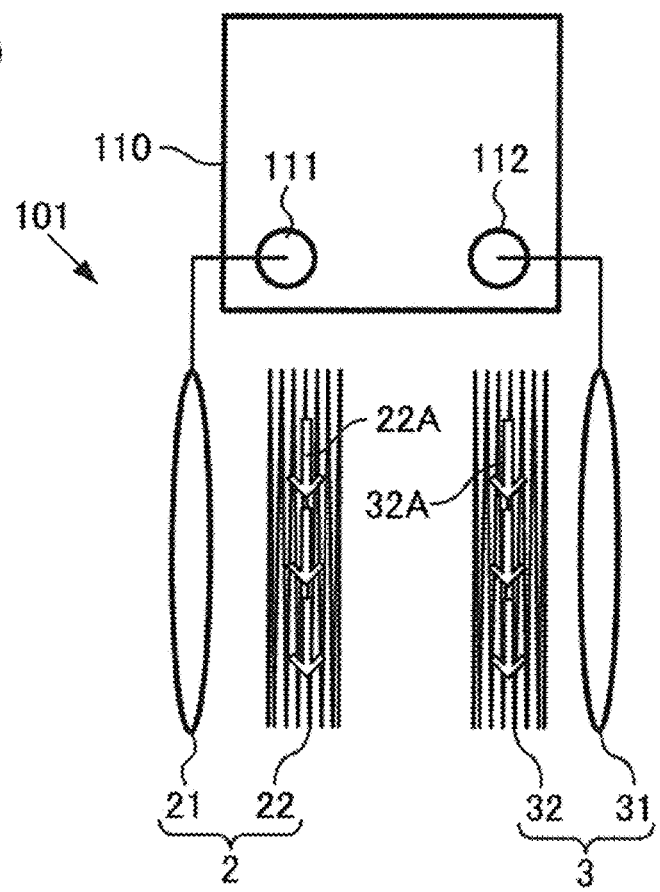
FIG. 4(A) illustrates an inphase resonance mode.
Figure 4B:
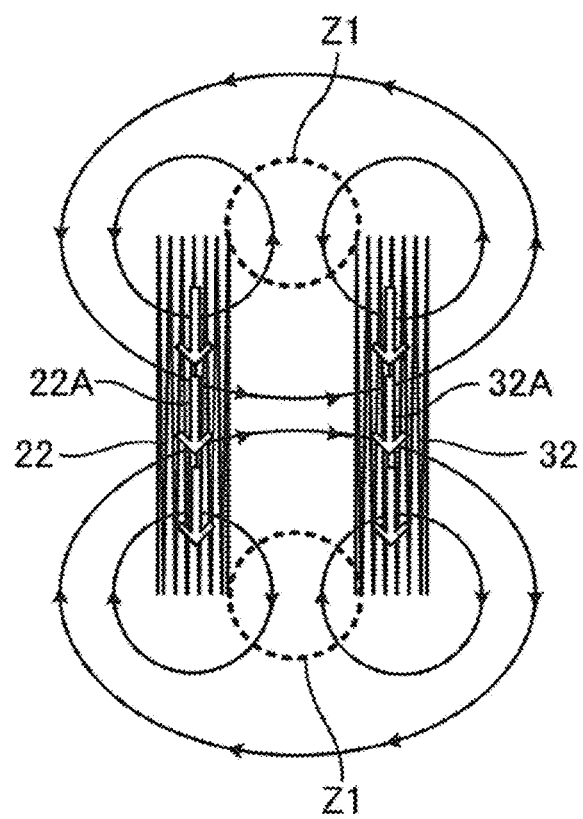
FIG. 4(B) is a magnetic field vector diagram in the inphase resonance mode.

When the frequency of the AC power to the power-supplying module 2 is set to the frequency fm nearby the peak on the low frequency side (inphase resonance mode), the power-supplying resonator 22 and the power-receiving resonator 32 are resonant with each other in inphase, and the current (22A) in the power-supplying resonator 22 and the current (32A) in the power-receiving resonator 32 both flow in the same direction, as shown in FIG. 4(A). As a result, as shown in the magnetic field vector diagram in FIG. 4(B), because the magnetic field generated on the outer circumference side of the power-supplying resonator 22 and the magnetic field generated on the outer circumference side of the power-receiving resonator 32 cancel each other out, the electromagnetic spaces Z1 each having a lower magnetic field strength than the magnetic field strengths in positions not on the outer circumference sides of the power-supplying resonator 22 and the power-receiving resonator 32 (e.g., the magnetic field strengths on the inner circumference sides of the power-supplying resonator 22 and the power-receiving resonator 32) are formed on the outer circumference sides of the power-supplying resonator 22 and the power-receiving resonator 32, as the influence of the magnetic fields is lowered. Note that the resonance state in which the current in the coil (power-supplying resonator 22) of the power-supplying module 2 and the current in the coil (power-receiving resonator 32) of the power-receiving module 3 both flow in the same direction is referred to as inphase resonance mode.

Figure 5:
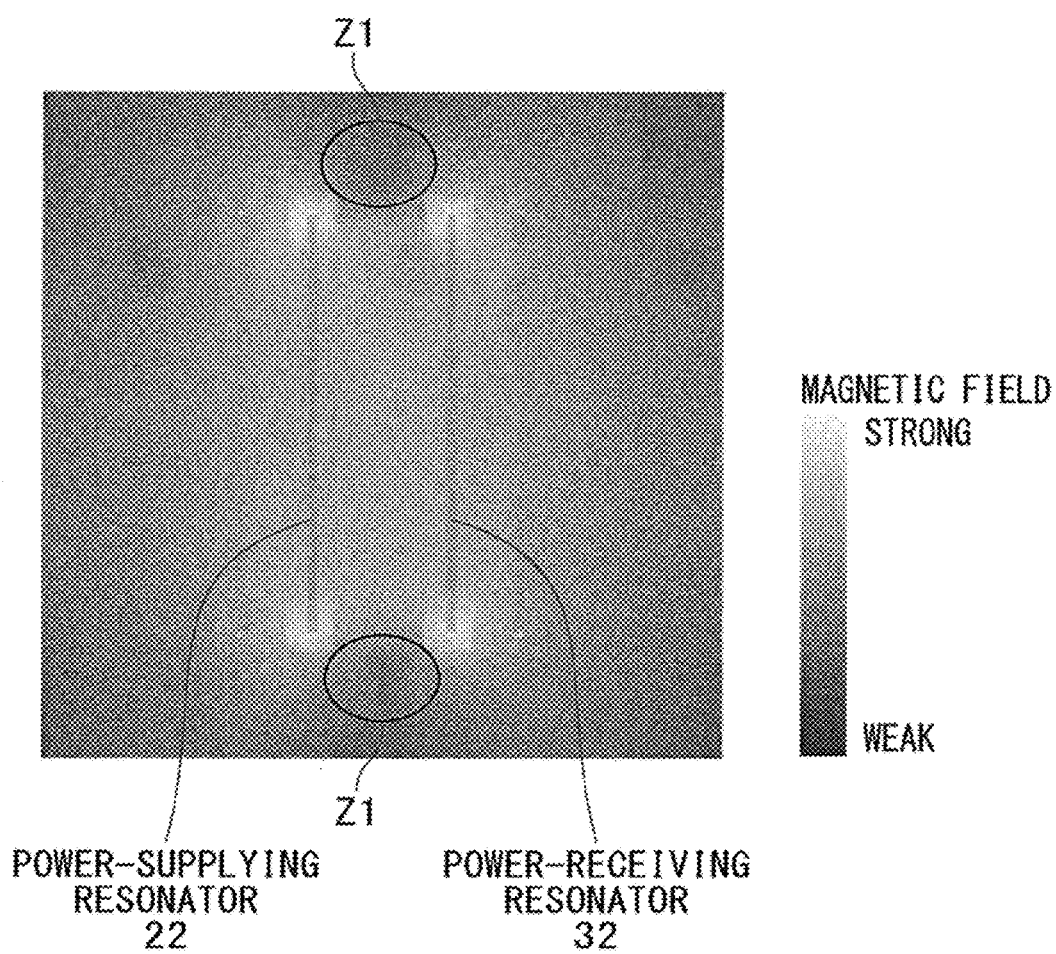
FIG. 5 illustrates magnetic field strength distribution in the inphase resonance mode, which is measured by means of electromagnetic field analysis.

In FIG. 5, the magnetic field strength distribution around the power-supplying resonator 22 and the power-receiving resonator 32 in the above-described inphase resonance mode is shown as a measurement result analyzed based on the electromagnetic field analysis and displayed such that magnetic field strengths are shown in different color tones. This magnetic field strength distribution shown in FIG. 5 demonstrates that, on account of lowered influence of the magnetic fields, electromagnetic spaces Z1 each having a relatively low magnetic field strength are formed on the outer circumference sides of the power-supplying resonator 22 and the power-receiving resonator 32.

Figure 6A:
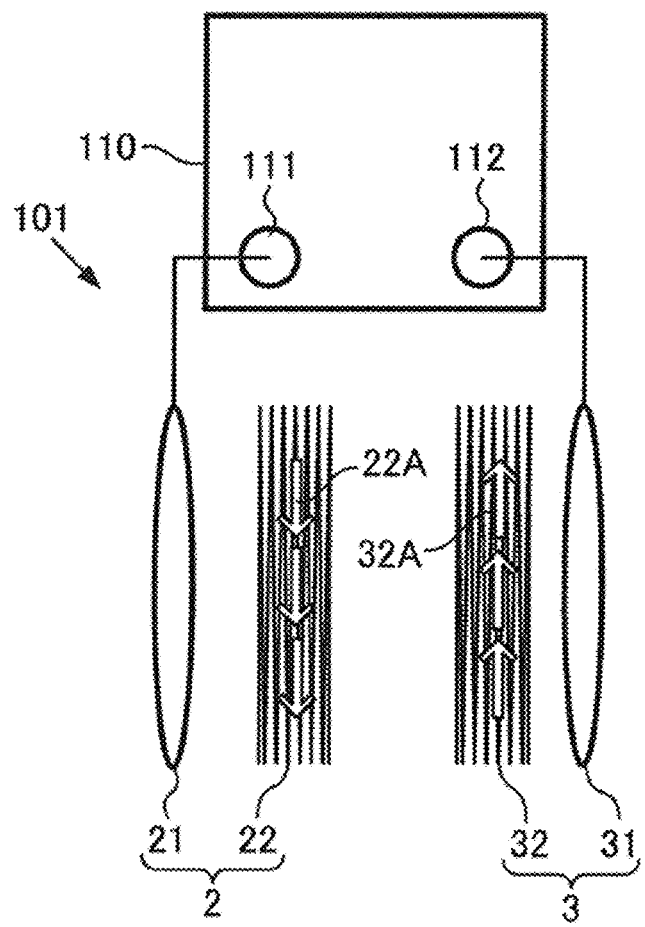
FIG. 6(A) illustrates an antiphase resonance mode.
Figure 6B:
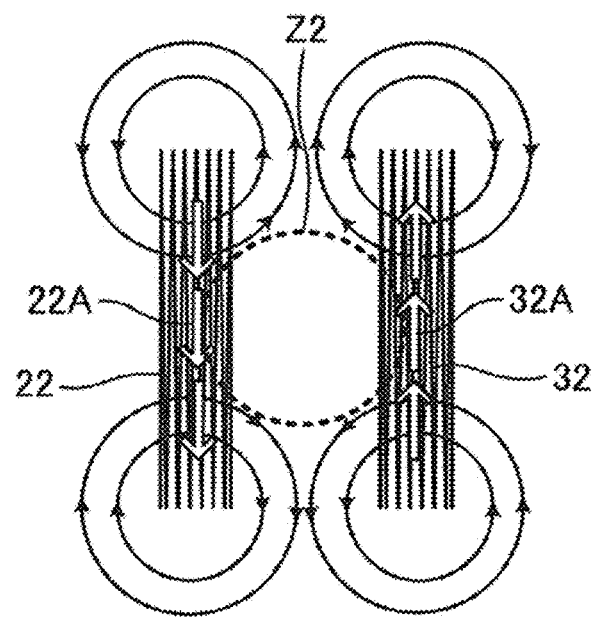
FIG. 6(B) is a magnetic field vector diagram in the antiphase resonance mode.

On the other hand, when the frequency of the AC power to the power-supplying module 2 is set to the frequency fe nearby the peak on the side of the high frequency side (antiphase resonance mode), the power-supplying resonator 22 and the power-receiving resonator 32 resonated with each other in antiphase, and the current (22A) in the power-supplying resonator 22 and the current (32A) in the power-receiving resonator 32 flow opposite directions to each other, as shown in FIG. 6(A). As a result, as the magnetic field vector diagram in FIG. 6(B) shows, because the magnetic field generated on the inner circumference side of the power-supplying resonator 22 and the magnetic field generated on the inner circumference side of the power-receiving resonator 32 cancel each other out, the electromagnetic space Z2 having a lower magnetic field strength than the magnetic field strengths in positions not on the inner circumference sides of the power-supplying resonator 22 and the power-receiving resonator 32 (e.g., the magnetic field strengths on the outer circumference sides of the power-supplying resonator 22 and the power-receiving resonator 32) is formed on the inner circumference sides of the power-supplying resonator 22 and the power-receiving resonator 32, as the influence of the magnetic fields is lowered. The resonance state in which the current in the coil (power-supplying resonator 22) of the power-supplying module 2 and the current in the coil (power-receiving resonator 32) of the power-receiving module 3 flow opposite directions to each other is referred to as antiphase resonance mode.

Figure 7:
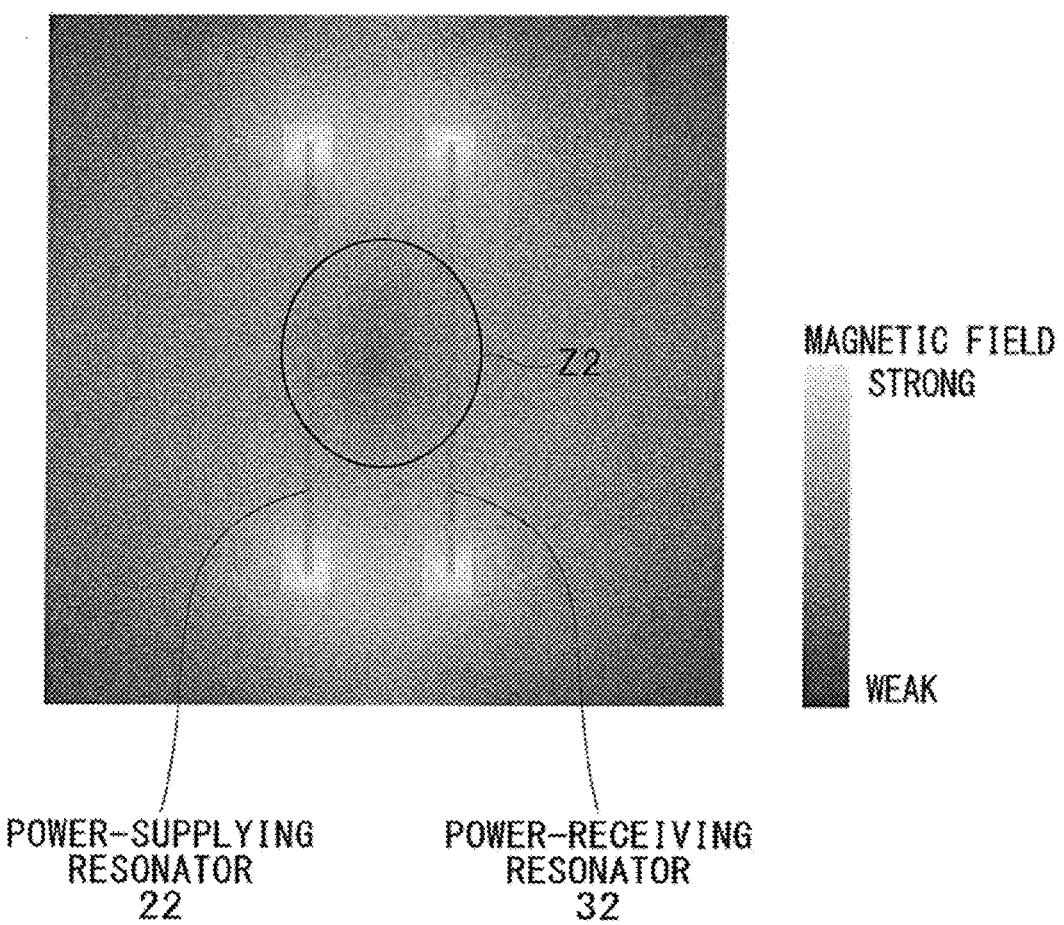
FIG. 7 illustrates magnetic field strength distribution in the antiphase resonance mode, which is measured by means of the electromagnetic field analysis.

In FIG. 7, the magnetic field strength distribution around the power-supplying resonator 22 and the power-receiving resonator 32 in the above-described antiphase resonance mode is shown as a measurement result analyzed based on the electromagnetic field analysis and displayed such that magnetic field strengths are shown in different color tones. This magnetic field strength distribution shown in FIG. 7 demonstrates that, on account of lowered influence of the magnetic fields, an electromagnetic space Z2 having a relatively low magnetic field strength is formed on the inner circumference sides of the power-supplying resonator 22 and the power-receiving resonator 32.

According to the method described above, when power is supplied from the power-supplying resonator 22 of the power-supplying module 2 to the power-receiving resonator 32 of the power-receiving module 3 by means of resonance, because the power-supplying resonator 22 and the power-receiving resonator 32 are provided in proximity to each other, the magnetic field generated around the power-supplying resonator 22 and the magnetic field generated around the power-receiving resonator 32 cancel each other out, with the result that an electromagnetic space (Z1 or Z2) is formed at a desired position on the inner circumference sides or on the outer circumference sides of the power-supplying resonator 22 and the power-receiving resonator 32, the magnetic field strength of the formed electromagnetic space being lower than the magnetic field strengths in positions other than the desired position.

Furthermore, as described above, when power is supplied from the power-supplying resonator 22 to the power-receiving resonator 32 by resonance, because the frequency of the AC power supplied to the power-supplying module 2 is set in the inphase resonance mode, the current in the power-supplying resonator 22 of the power-supplying module 2 and the current in the power-receiving resonator 32 of the power-receiving module 3 flow in the same direction, and because the magnetic field generated on the outer circumference side of the power-supplying resonator 22 and the magnetic field on the outer circumference side of the power-receiving resonator 32 cancel each other out, the electromagnetic spaces 21 each having a lower magnetic field strength than the magnetic field strengths in positions not on the outer circumference sides of the power-supplying resonator 22 and the power-receiving resonator 32 are formed on the outer circumference sides of the power-supplying resonator 22 and the power-receiving resonator 32, as the influence of the magnetic field is lowered.

Furthermore, as described above, when power is supplied from the power-supplying resonator 22 to the power-receiving resonator 32 by means of resonance, because the frequency of the AC power supplied to the power-supplying module 2 is set in the antiphase resonance mode, the current in the power-supplying resonator 22 of the power-supplying module 2 and the current in the power-receiving resonator 32 of the power-receiving module 3 flow in the same direction and hence the magnetic field generated on the inner circumference side of the power-supplying resonator 22 and the magnetic field generated on the inner circumference side of the power-receiving resonator 32 cancel each other out, with the result that the electromagnetic space Z2 having a lower magnetic field strength than the magnetic field strengths in positions not on the inner circumference sides of the power-supplying resonator 22 and the power-receiving resonator 32 is formed on the inner circumference sides of the power-supplying resonator 22 and the power-receiving resonator 32, as the influence of the magnetic field is lowered.

(Change in Size of Electromagnetic Space Z)

The following will describe a change in the size of the electromagnetic space Z by utilizing the wireless power transmission system 101 connected to the above-described network analyzer 110.

To change the size of the electromagnetic space Z, the degree of coupling (magnetic field coupling) between the magnetic field of the power-supplying resonator 22 of the power-supplying module 2 and the magnetic field of the power-receiving resonator 32 of the power-receiving module 3 is changed. To change the degree of magnetic field coupling, adjustable parameters of the power-supplying coil 21 and the power-supplying resonator 22 in the power-supplying module 2 and the power-receiving coil 31 and the power-receiving resonator 32 in the power-receiving module 3 are changed. Specific examples of the adjustable parameters include a positional relationship between the power-supplying coil 21 and the power-supplying resonator 22 in the power-supplying module 2, a positional relationship between the power-receiving coil 31 and the power-receiving resonator 32 in the power-receiving module 3, the magnitude of the power supplied to the power-supplying module 2, the capacity and inductance of each device (e.g., a capacitor and a coil) of the power-supplying resonator 22 and of the power-receiving resonator 32, and the frequency of the power supplied to the power-supplying module 2.

According to the method above, as the degree of the magnetic field coupling between the power-supplying resonator 22 and the power-receiving resonator 32 is changed by changing the adjustable parameters regarding the power-supplying coil 21 and the power-supplying resonator 22 of the power-supplying module 2 and the power-receiving coil 31 and the power-receiving resonator 32 of the power-receiving module 3, the size of the electromagnetic space (Z1 or Z2) is changed. For example, the size of the electromagnetic space (Z1 or Z2) is increased by relatively lowering the degree of the magnetic field coupling between the power-supplying resonator 22 and the power-receiving resonator 32. On the other hand, the size of the electromagnetic space (Z1 or Z2) is decreased by relatively increasing the degree of the magnetic field coupling between the power-supplying resonator 22 and the power-receiving resonator 32.

The examples presuppose that the positional relationship between power-supplying coil 21 and the power-supplying resonator 22 of the power-supplying module 2 and the positional relationship between the power-receiving coil 31 an the power-receiving resonator 32 of the power-receiving module 3 are changed, and the adjustable parameters are the distance A (first distance) between the power-supplying coil 21 and the power-supplying resonator 22 and the distance B (second distance) between the power-receiving resonator 32 and the power-receiving coil 31. In the examples, the size of the electromagnetic space Z is changeable by changing the distance A and the distance B. The size of the electromagnetic space Z is analyzed by means of the electromagnetic field analysis, and the magnetic field strengths are displayed in different color tones. In the examples, the distance C between the power-supplying resonator 22 and the power-receiving resonator 32 is fixed to 30 mm when the measurement is conducted.

In the wireless power transmission system 101 of the example 1, the antiphase resonance mode is set and the distances are set such that the distance A=the distance B=15 mm and the distance C=0.30 mm. In the wireless power transmission system 101 of the example 2, the antiphase resonance mode is set and the distances are set such that the distance A=the distance B=20 mm and the distance C=30 mm. In the wireless power transmission system 101 of the example 3, the antiphase resonance mode is set and the distances are set such that the distance A=the distance B=25 mm and the distance C=30 mm. In the wireless power transmission system 101 of the example 4, the antiphase resonance mode is set and the distances are set such that the distance A=the distance B=30 mm and the distance C=30 mm.

In the wireless power transmission system 101 of the example 5, the inphase resonance mode is set and the distances are set such that the distance A=the distance B=20 mm and the distance C=30 mm. In the wireless power transmission system 101 of the example 6, the inphase resonance mode is set and the distances are set such that the distance A=the distance B=25 mm and the distance C=30 mm. In the wireless power transmission system 101 of the example 7, the inphase resonance mode is set and the distances are set such that the distance A=the distance B=30 mm and the distance C=30 mm.

Figure 8:
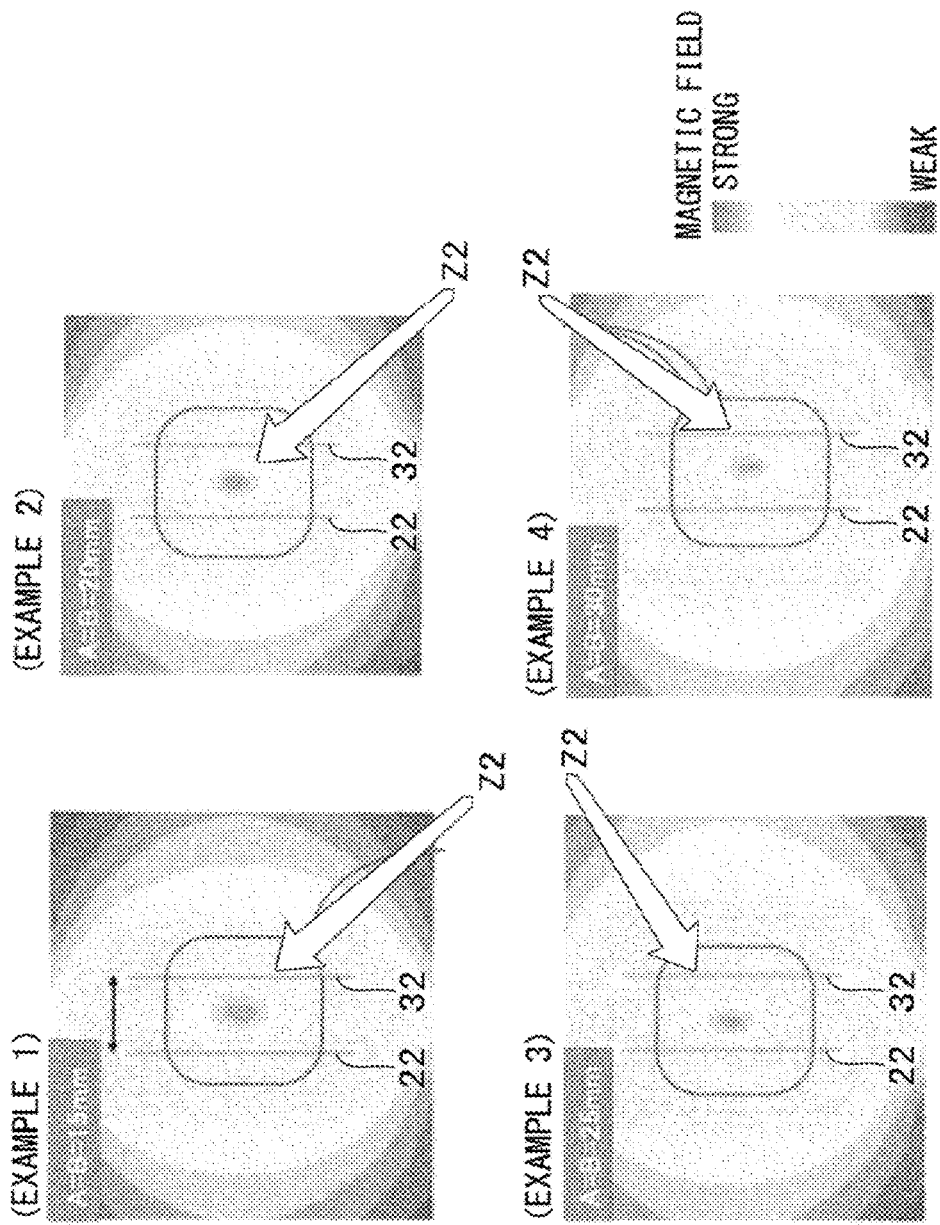
FIG. 8 illustrates magnetic field strength distributions in examples 1 to 4, when the antiphase resonance mode is set.

The magnetic field strength distributions of the examples 1 to 4 when the antiphase resonance mode is set are shown in FIG. 8, which are measurement results analyzed by means of the electromagnetic field analysis, and in which the magnetic field strengths are displayed in different color tones. The magnetic field distributions shown in FIG. 8 indicate that, as the distance A and the distance B decrease (30 mm to 25 mm to 20 mm to 15 mm), the magnetic field strength between the power-supplying resonator 22 and the power-receiving resonator 32 decreases, and the degree of coupling (magnetic field coupling) of the magnetic fields of the power-supplying resonator 22 and the power-receiving resonator 32 also decreases. While the magnetic field coupling between the power-supplying resonator 22 and the power-receiving resonator 32 decreases, the figure shows that the size of the electromagnetic space Z2 increases as the distance A and the distance B decrease. To put it differently, as the distance A and the distance B increase (15 mm to 20 mm to 25 mm to 30 mm), the magnetic field strength between the power-supplying resonator 22 and the power-receiving resonator 32 increases, with the result that the degree of coupling (magnetic field coupling) of the magnetic fields of the power-supplying resonator 22 and the power-receiving resonator 32 increases. While the magnetic field coupling between the power-supplying resonator 22 and the power-receiving resonator 32 increases, the size of the electromagnetic space Z2 decreases as the distance A and the distance B increase.

Figure 9:
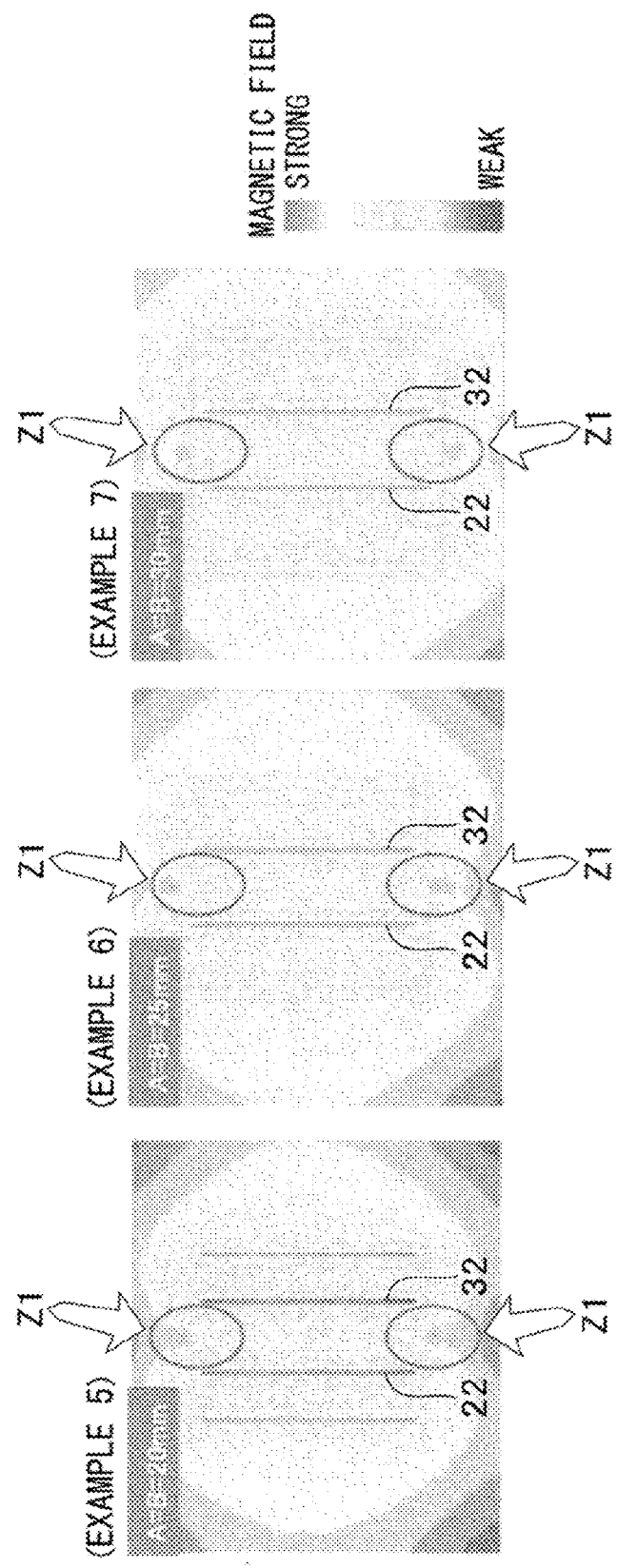
FIG. 9 illustrates magnetic field strength distributions in examples 5 to 7, when the inphase resonance mode is set.

The magnetic field strength distributions of the examples 5 to 7 when the inphase resonance mode is set are shown in FIG. 9, which are measurement results analyzed by means of the electromagnetic field analysis and in which the magnetic field strengths are displayed in different color tones. The magnetic field distributions in FIG. 9 indicate that, as the distance A and the distance B decrease (30 mm to 25 mm to 20 mm), the magnetic field strength between the power-supplying resonator 22 and the power-receiving resonator 32 decreases and the degree of coupling (magnetic field coupling) of the magnetic fields of the power-supplying resonator 22 and the power-receiving resonator 32 also decreases. While the magnetic field coupling between the power-supplying resonator 22 and the power-receiving resonator 32 decreases, the size of the electromagnetic space Z1 increases as the distance A and the distance B decrease. To put it differently, as the distance A and the distance B increase (20 mm to 25 mm to 30 mm), the magnetic field strength between the power-supplying resonator 22 and the power-receiving resonator 32 increases, and the degree of coupling (magnetic field coupling) of the magnetic fields of the power-supplying resonator 22 and the power-receiving resonator 32 also increases. While the magnetic field coupling between the power-supplying resonator 22 and the power-receiving resonator 32 increases, the size of the electromagnetic space Z1 decreases as the distance A and the distance B increase.

(Change in Size of Electromagnetic Space Z: Verification Using Metal Foil)

In the description above, with the assumption that the distance A (first distance) between the power-supplying coil 21 and the power-supplying resonator 22 and the distance B (second distance) between the power-receiving resonator 32 and the power-receiving coil 31 are adjustable parameters, changes in the size of the electromagnetic space Z achieved by changing the distance A and the distance B have been described based on the measurement of the magnetic field distribution by means of the electromagnetic field analysis. In the following description, whether the size of the electromagnetic space Z has been changed is verified by measuring the power transmission efficiencies when metal foils (aluminum foils 60) having various sizes are inserted between the power-supplying resonator 22 and the power-receiving resonator 32 (see FIG. 10). As described above, the power transmission efficiency indicates the ratio of power supplied from the output terminal 111 to the power-supplying module 2 to the power output to the input terminal 112 while the network analyzer 110 is connected to the wireless power transmission system 101. The measurement presupposes that, the power transmission efficiency when no metal foil is inserted between the power-supplying resonator 22 and the power-receiving resonator 32 is η0, the power transmission efficiency when a metal foil is inserted between the power-supplying resonator 22 and the power-receiving resonator 32 is ηm, and the difference between these power transmission efficiencies is Δη(η0−ηm).

Figure 10:
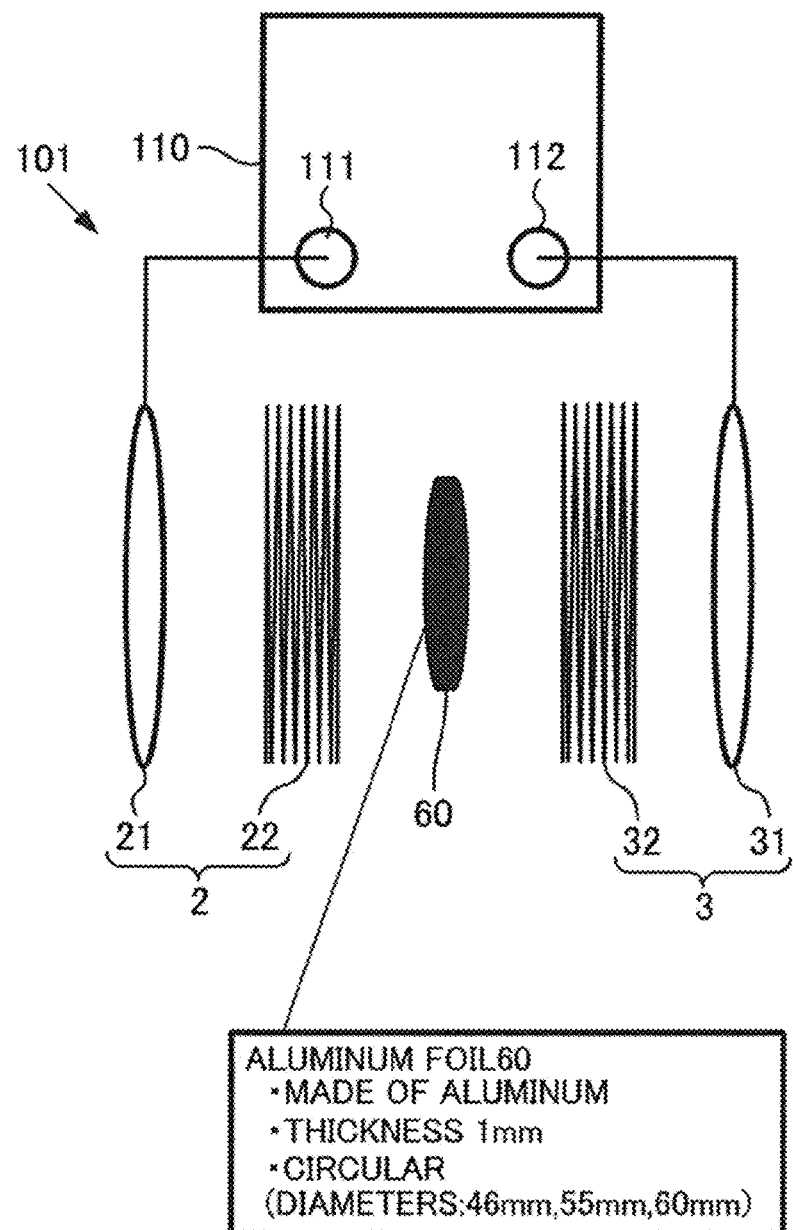
FIG. 10 shows the structure of a wireless power transmission system of each of examples 8 to 11.

More specifically, as shown in FIG. 10, by using the wireless power transmission system 101 connected to the network analyzer 110, the power transmission efficiency is measured in the antiphase resonance mode, in each of the examples 8 to 11. In the example 8, the distance A and the distance B are set at 5 mm and the distance C is set at 30 mm, and the power transmission efficiency η0 when no aluminum foil 60 is inserted between the power-supplying resonator 22 and the power-receiving resonator 32 and the difference Δη(η0−ηm) between the power transmission efficiency η0 and the power transmission efficiency ηm when each of three types of circular aluminum foils 60 which are 1 mm thick and are 46 mm, 55 mm, and 60 mm in diameter is inserted between the power-supplying resonator 22 and power-receiving resonator 32 are measured. In a similar manner, in the example 9, the distance A and the distance B are set at 10 mm and the distance C is set at 30 mm, and the power transmission efficiency η0 and the difference Δη(η0−ηm) between the power transmission efficiency η0 and the power transmission efficiency ηm when each of the three types of circular aluminum foils 60 is inserted are measured. In a similar manner, in the example 10, the distance A and the distance B are set at 15 mm and the distance C is set at 30 mm, and the power transmission efficiency η0 and the difference Δη(η0−ηm) between the power transmission efficiency η0 and the power transmission efficiency ηm when each of the three types of circular aluminum foils 60 is inserted are measured. In a similar manner, in the example 11, the distance A and the distance B are set at 20 mm and the distance C is set at 30 mm, and the power transmission efficiency η0 and the difference Δη(η0−ηm) between the power transmission efficiency η0 and the power transmission efficiency nm when each of the three types of circular aluminum foils 60 is inserted are measured.

FIG. 11 shows measurement results of the power transmission efficiency η0 and the difference Δη(η0−ηm) between the power transmission efficiency η0 and the power transmission efficiency ηm when each of the three types of circular aluminum foils 60 is inserted, in the examples 8 to 11. Furthermore, FIG. 12 shows a graph plotted based on the measurement results, in which the horizontal axis indicates the diameter of the circular aluminum foil 60 and the vertical axis indicates the difference Δη(η0−ηm) between the power transmission efficiencies.

Figure 12:
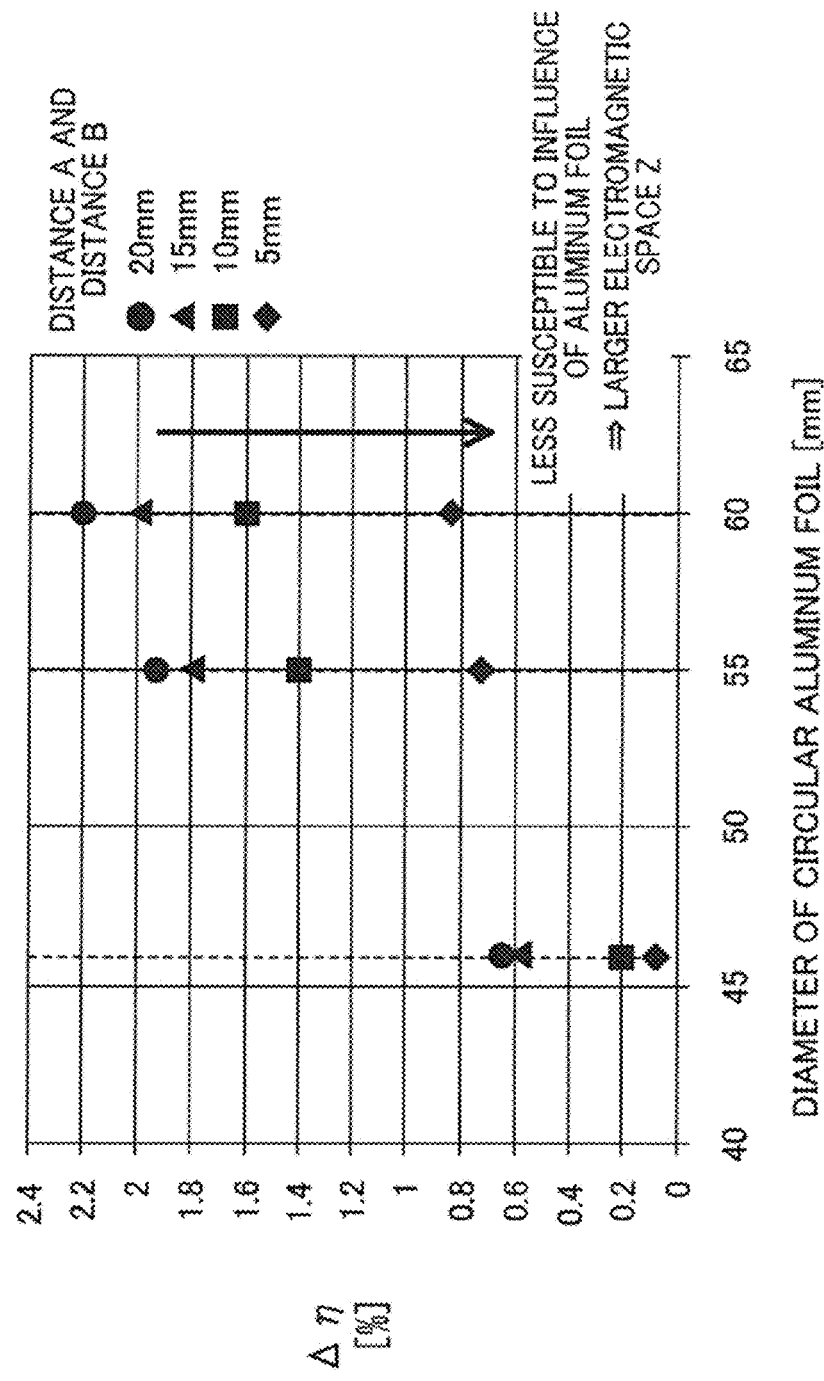
FIG. 12 is a graph plotted based on the measurement results shown in FIG. 11, in which the horizontal axis indicates the diameter of the circular aluminum foil whereas the vertical axis indicates the difference $\Delta \eta (\eta 0 - \eta m)$ between the power transmission efficiencies.

As shown in FIG. 11 and FIG. 12, the difference Δη(η0−ηm) between the power transmission efficiency η0 when no metal foil is inserted between the power-supplying resonator 22 and the power-receiving resonator 32 and the power transmission efficiency ηm when a metal foil is inserted between the power-supplying resonator 22 and the power-receiving resonator 32 decreases as the distance A and the distance B decrease (FIG. 12: 20 mm (Circle) to 15 mm (Triangle) to 10 mm (Square) to 5 mm (Diamond)). This indicates that the power transmission efficiency nm is less influenced by the aluminum foil 60, as the distance A and the distance B decrease. To put it differently, as the distance A and the distance B decrease, the electromagnetic space Z2 which is less susceptible to the influence of the aluminum foil 60 (i.e., having a relatively low magnetic field strength) spreads. As such, the verification results using the metal foils (aluminum foils 60) show that the size of the electromagnetic space Z2 increases as the distance A and the distance B decrease.

According to the method above, when wireless power transmission utilizing the magnetic field resonant state is conducted between the power-supplying resonator 22 and the power-receiving resonator 32, the size of the electromagnetic space (Z1 or Z2) is changeable by changing the degree of the magnetic field coupling by changing the adjustable parameters regarding the power-supplying coil 21, the power-supplying resonator 22, the power-receiving coil 31, and the power-receiving resonator 32.

More specifically, when wireless power transmission utilizing the magnetic field resonant state is conducted between the power-supplying resonator 22 and the power-receiving resonator 32, the size of the electromagnetic space (Z1 or Z2) is changeable by changing the degree of the magnetic field coupling by changing the distance A (first distance) between the power-supplying coil 21 and the power-supplying resonator 22 and the distance B (second distance) between the power-receiving resonator 32 and the power-receiving coil 31. For example, when the distance A and the distance B are relatively shortened, the magnetic field coupling is relatively weaken and the size of the electromagnetic space (Z1 or Z2) is increased. On the other hand, when the distance A and the distance B are relatively elongated, the magnetic field coupling is relatively strengthen and the size of the electromagnetic space (Z1 or Z2) is decreased.
(Change in Shape of Electromagnetic Space Z)

Now, a change in the shape of the electromagnetic space Z using the wireless power transmission system 201, 301, 401 connected to the network analyzer 110 will be described.

To change the shape of the electromagnetic space Z, for example, in the case of the wireless power transmission system 101 shown in FIG. 2, the degree of coupling (magnetic field coupling) between and around the magnetic fields of the power-supplying coil 21 and the power-supplying resonator 22 of the power-supplying module 2 and the power-receiving coil 31 and the power-receiving resonator 32 of the power-receiving module 3 is changed. To change the degree of the magnetic field coupling, the coil shapes of the power-supplying coil 21 and the power-supplying resonator 22 of the power-supplying module 2 and the power-receiving coil 31 and the power-receiving resonator 32 of the power-receiving module 3 are changed.

According to the method above, by causing the power-supplying coil 21 and the power-supplying resonator 22 of the power-supplying module 2 and the power-receiving coil 31 and the power-receiving resonator 32 of the power-receiving module 3 to have desired shapes, an electromagnetic space Z having a relatively low magnetic field strength is formed with a desired shape corresponding to the shapes of the power-supplying coil 21 and the power-supplying resonator 22 and the power-receiving coil 31 and the power-receiving resonator 32 of the power-receiving module 3. That is to say, by changing the shapes of the power-supplying coil 21 and the power-supplying resonator 22 and the power-receiving coil 31 and the power-receiving resonator 32 of the power-receiving module 3, it is possible to change (control) the shape of the electromagnetic space Z having a relatively low magnetic field strength.

In the examples, the coil shapes are dealt with as adjustable parameters for changing the degree of the magnetic field coupling between and around the coil of the power-supplying module and the coil of the power-receiving module. Now, why the shape of the electromagnetic space Z is changeable will be described with reference to the measurement of the shape of the electromagnetic space Z in the example 1 in which the coil shape is circular (see wireless power transmission system 201 shown in FIG. 13), in the example 2 in which the coil shape is rectangular (see the wireless power transmission system 301 shown in FIG. 15), and in the example 3 in which the coil shape is crescent (see the wireless power transmission system 401 shown in FIG. 17). The measurement of the shape of the electromagnetic space Z is performed such that the shape is analyzed by means of the electromagnetic field analysis and the magnetic field strengths are displayed in different color tones.

Example 1 Regarding Change in Shape of Electromagnetic Space Z: Circular Coil

Figure 13:
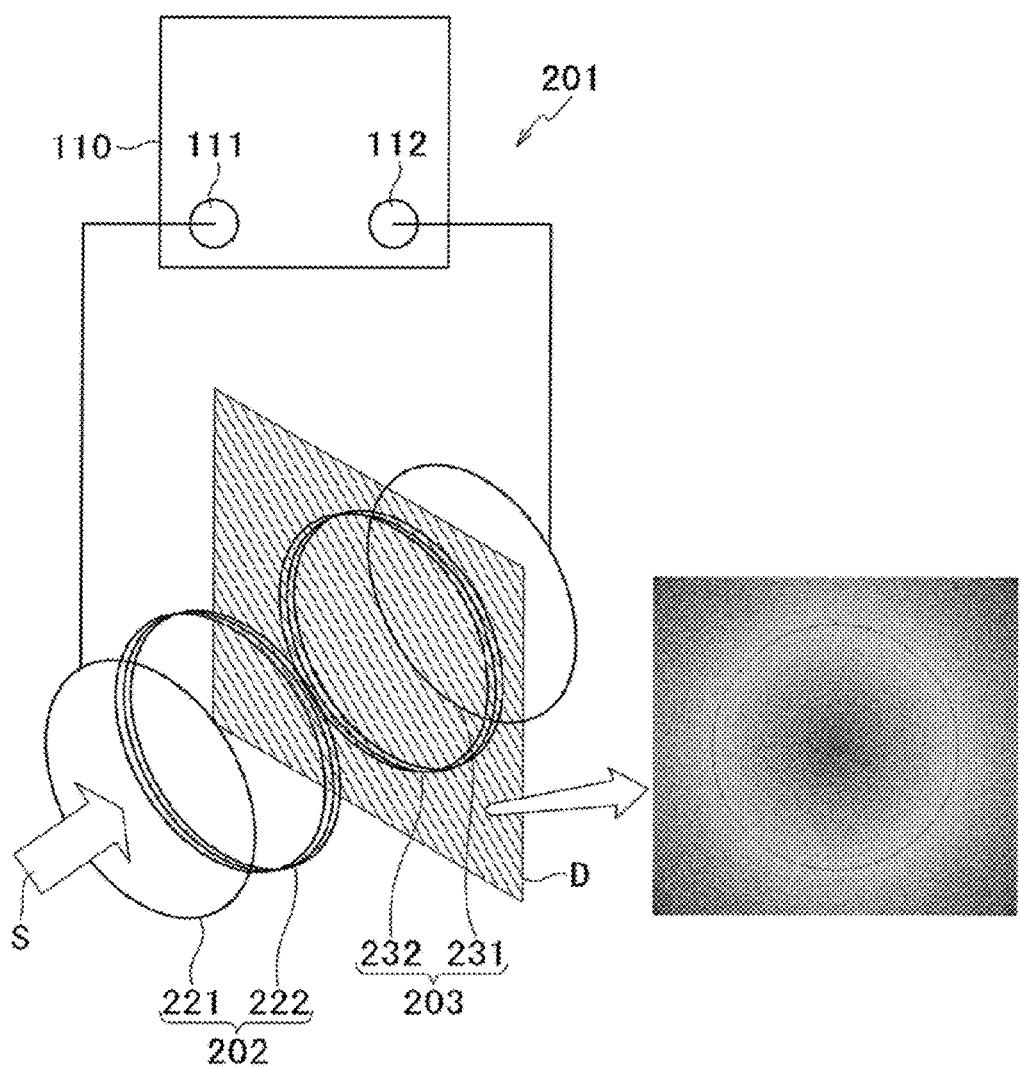
FIG. 13 shows the structure of the wireless power transmission system of the example 1, when the shape of the electromagnetic space is changed.

In the wireless power transmission system 201 of the example 1, as shown in FIG. 13, a power-supplying module 202 including a circular power-supplying coil 221 and a cylindrical power-supplying resonator 222 and a power-receiving module 203 including a circular power-receiving coil 231 and a cylindrical power-receiving resonator 232 are provided. The power-supplying coil 221 is connected to the output terminal 111 of the network analyzer 110 and the power-receiving coil 231 is connected to the input terminal 112 of the network analyzer 110.

Each of the power-supplying coil 221 and the power-receiving coil 231 is circularly formed by winding once a copper wire material (coated by insulation film) having a wire diameter of 1 mmϕ and its inner diameter is set to 100 mm.

Each of the power-supplying resonator 222 and the power-receiving resonator 232 is a LC resonance circuit, and is cylindrically formed by winding three times a copper wire material (coated by insulation film) having a wire diameter of 1 mmϕ, and its inner diameter is set to 100 mm.

The distance A between the power-supplying coil 221 and the power-supplying resonator 222 is set to 15 mm, the distance C between the power-supplying resonator 222 and the power-receiving resonator 232 is set to 30 mm, and the distance B between the power-receiving resonator 232 and the power-receiving coil 231 is set to 15 mm. The resonance frequency of the power-supplying resonator 222 and the power-receiving resonator 232 is set to 14.2 MHz The power-supplying coil 221, the power-supplying resonator 222, the power-receiving resonator 232, and the power-receiving coil 231 are disposed so that the coil surfaces thereof oppose one another in a parallel manner.

As shown in FIG. 13, by using the wireless power transmission system 201 connected to the above-described network analyzer 110, the magnetic field strength distribution when the cross section D of the power-supplying resonator 222 and the power-receiving resonator 232 is viewed in the direction of the arrow S is measured. The measurement of the magnetic field strength distribution is done in the above-described inphase resonance mode and in the above-described antiphase resonance mode.

Figure 14:
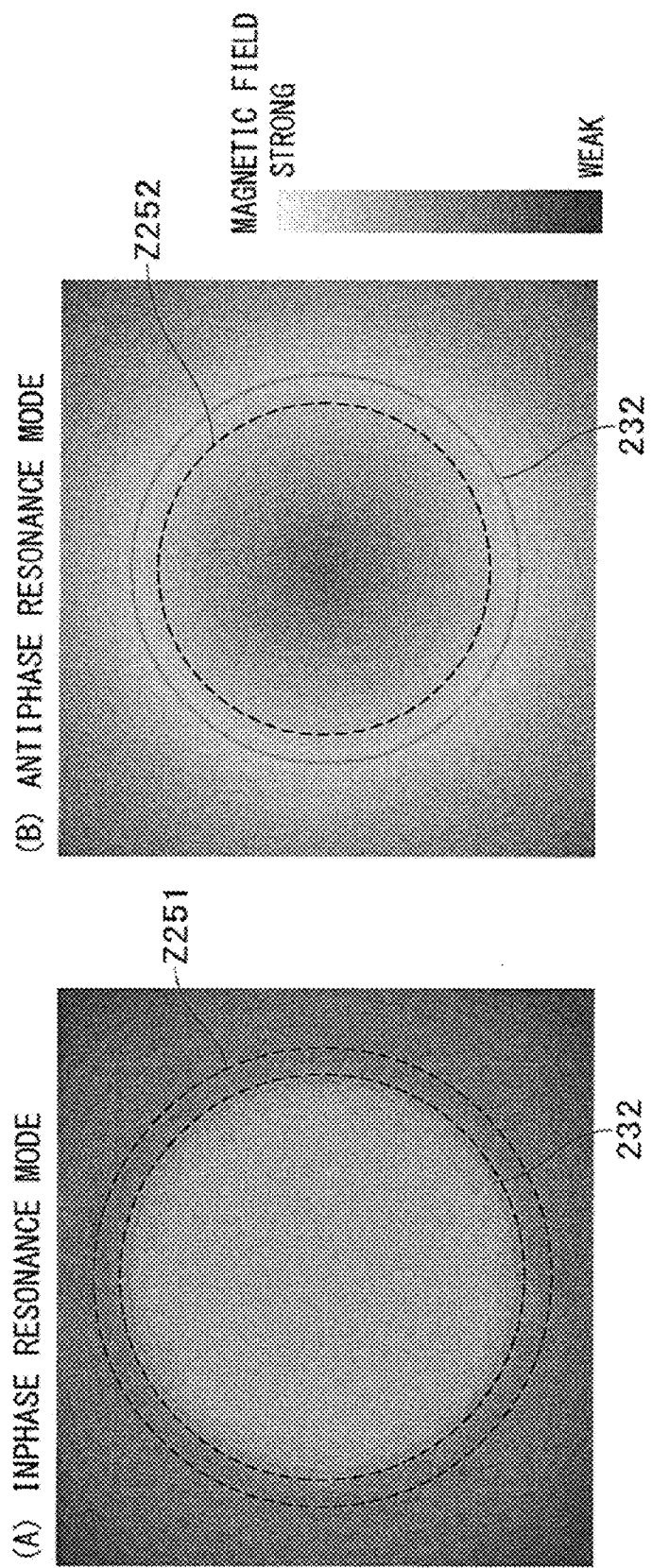
FIG. 14 illustrates the magnetic field strength distribution in the example 1, when the shape of the electromagnetic space is changed.

To begin with, the measurement result of the magnetic field strength distribution in the inphase resonance mode, which is analyzed by means of the electromagnetic field analysis and in which the magnetic field strengths are displayed in different color tones, is shown in FIG. 14(A). The magnetic field strength distribution shown in FIG. 14(A) indicates that an electromagnetic space Z251 having a relatively low (small) magnetic field strength with a reduced influence of the magnetic fields is formed along the vicinity of the outer circumference side of the power-receiving resonator 232. This electromagnetic space Z251 has a circular shape along the power-receiving resonator 232 which is circular in cross section.

Now, the measurement result of the magnetic field strength distribution in the antiphase resonance mode, which is analyzed by means of the electromagnetic field analysis and in which the magnetic field strengths are displayed in different color tones, is shown in FIG. 14(B). The magnetic field strength distribution shown in FIG. 14(B) indicates that an electromagnetic space Z252 having a relatively low (small) magnetic field strength with a reduced influence of the magnetic fields is formed along the power-receiving resonator 232, on the inner circumference side of the power-receiving resonator 232. This electromagnetic space Z252 clearly has a circular (cylindrical) shape along the power-receiving resonator 232 which is circular in cross section.

Figure 15:
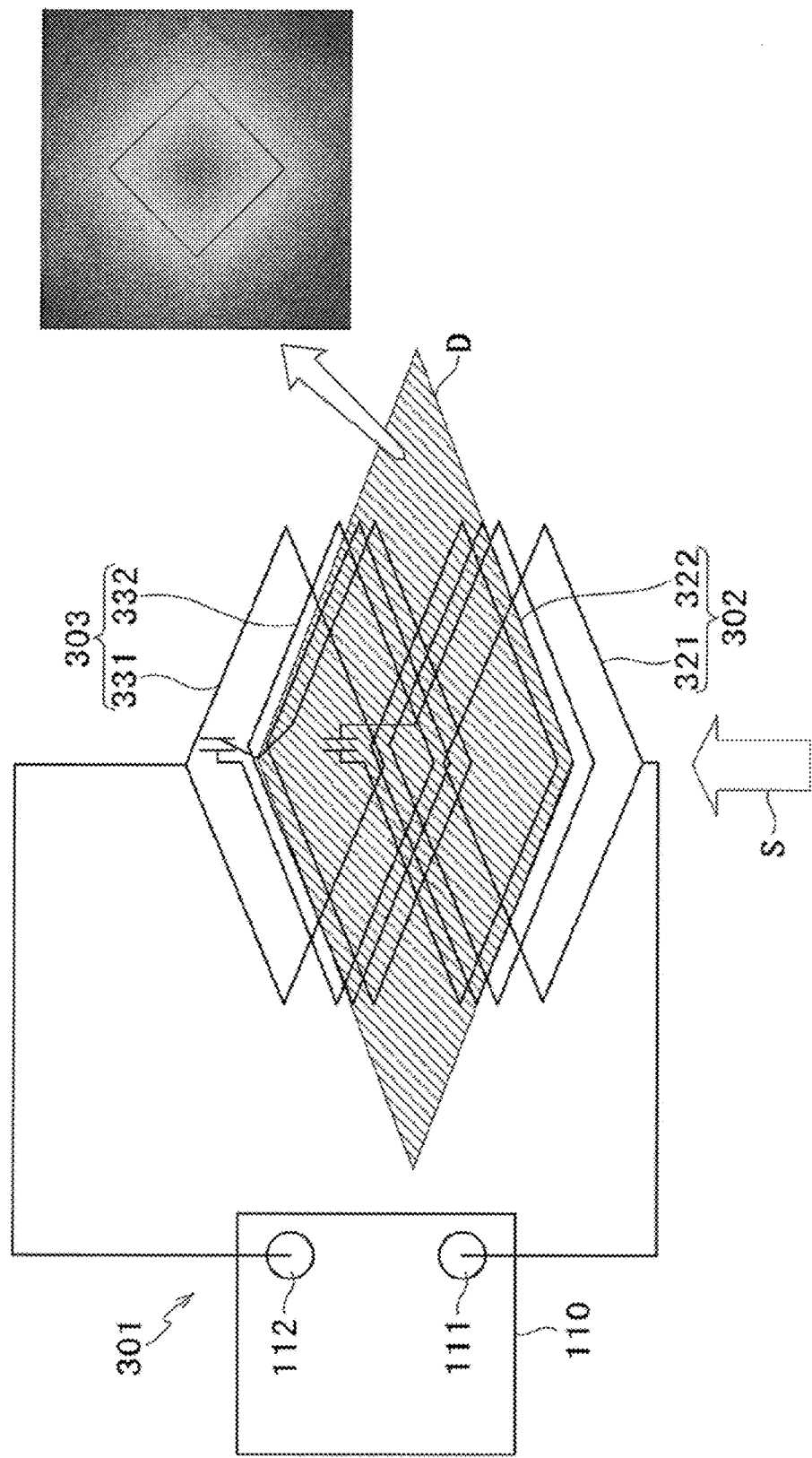
FIG. 15 shows the structure of the wireless power transmission system of the example 2, when the shape of the electromagnetic space is changed.

Example 2 Regarding Change in Shape of Electromagnetic Space Z: Rectangular Coil In the wireless power transmission system 301 of the example 2, as shown in FIG. 15, a power-supplying module 302 including a rectangular power-supplying coil 321 and a power-supplying resonator 322 having a quadrangular cylindrical coil shape and a power-receiving module 303 including a rectangular power-receiving coil 331 and a power-receiving resonator 332 having a quadrangular cylindrical coil shape are provided. The power-supplying coil 321 is connected to the output terminal 111 of the network analyzer 110 and the power-receiving coil 331 is connected to the input terminal 112 of the network analyzer 110.

Each of the power-supplying coil 321 and the power-receiving coil 331 is formed by winding once a copper wire material (coated by insulation film) having a wire diameter of 1 mmϕ, so as to have a square shape which is 100 mm on each side.

Each of the power-supplying resonator 322 and the power-receiving resonator 332 is a LC resonance circuit, and is formed by winding three times a copper wire material (coated by insulation film) having a wire diameter of 1 mmϕ so as to be a quadrangular cylindrical coil which is 100 mm on each side.

The distance A between the power-supplying coil 321 and the power-supplying resonator 322 is set to 15 mm, the distance C between the power-supplying resonator 322 and the power-receiving resonator 332 is set to 30 mm, and the distance B between the power-receiving resonator 332 and the power-receiving coil 331 is set to 15 mm. The resonance frequency of the power-supplying resonator 322 and the power-receiving resonator 332 is set to 14.2 MHz Furthermore, the power-supplying coil 321, the power-supplying resonator 322, the power-receiving resonator 332, and the power-receiving coil 331 are disposed so that the coil surfaces thereof oppose one another in a parallel manner.

As shown in FIG. 15, by using the wireless power transmission system 301 connected to the above-described network analyzer 110, the magnetic field strength distribution when the cross section D of the power-supplying resonator 322 and the power-receiving resonator 332 is viewed in the direction of the arrow S is measured. The measurement of the magnetic field strength distribution is done in the above-described inphase resonance mode and in the above-described antiphase resonance mode.

Now, the measurement result of the magnetic field strength distribution in the inphase resonance mode, which is analyzed by means of the electromagnetic field analysis and in which the magnetic field strengths are displayed in different color tones, is shown in FIG. 16(A). The magnetic field strength distribution shown in FIG. 16(A) indicates that an electromagnetic space Z351 having a relatively low (small) magnetic field strength with a reduced influence of the magnetic fields is formed along the vicinity of the outer circumference side of the power-receiving resonator 332. This electromagnetic space Z351 has a rectangular shape which is along the power-receiving resonator 332 which is rectangular in cross section.

Now, the measurement result of the magnetic field strength distribution in the antiphase resonance mode, which is analyzed by means of the electromagnetic field analysis and in which the magnetic field strengths are displayed in different color tones, is shown in FIG. 16(B). The magnetic field strength distribution shown in FIG. 16(B) indicates that an electromagnetic space Z352 having a relatively low (small) magnetic field strength with a reduced influence of the magnetic fields is formed along the power-receiving resonator 332, on the inner circumference side of the power-receiving resonator 332. This electromagnetic space Z352 has a rectangular shape (quadrangular shape) which is along the power-receiving resonator 332 which is rectangular in cross section.

Example 3 Regarding Change in Shape of Electromagnetic Space Z: Crescent Coil

Figure 17:
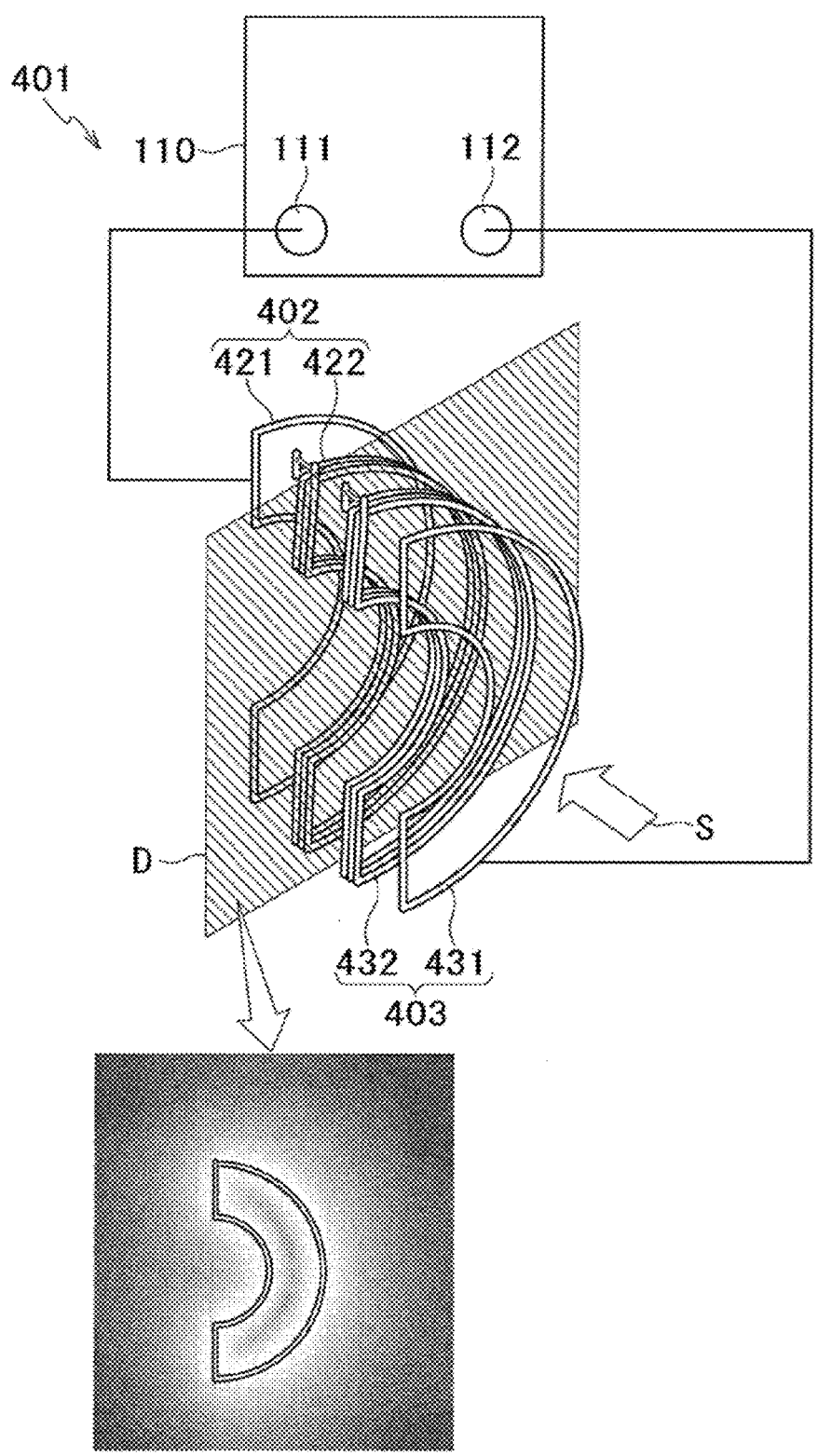
FIG. 17 shows the structure of the wireless power transmission system of the example 3, when the shape of the electromagnetic space is changed.

In the wireless power transmission system 401 of the example 3, as shown in FIG. 17, a power-supplying module 402 including a crescent power-supplying coil 421 and a power-supplying resonator 422 which is a crescent cylindrical coil and a power-receiving module 403 including a crescent power-receiving coil 431 and a power-receiving resonator 432 which is a crescent cylindrical coil are provided. The power-supplying coil 421 is connected to the output terminal 111 of the network analyzer 110 and the power-receiving coil 431 is connected to the input terminal 112 of the network analyzer 110.

Each of the power-supplying coil 421 and the power-receiving coil 431 is formed by winding once a copper wire material (coated by insulation film) having a wire diameter of 1 mmϕ so that each coil has a crescent shape such that the outer diameter of the power-supplying coil 421 is 60 mm and the inner diameter thereof is 30 mm.

Each of the power-supplying resonator 422 and the power-receiving resonator 432 is a LC resonance circuit, and is formed by winding three times a copper wire material (coated by insulation film) having a wire diameter of 1 mmϕ three times (at intervals of 0.1 mm), so as to be a crescent cylindrical coil which is 60 mm in outer diameter and 30 mm in inner diameter.

The distance A between the power-supplying coil 421 and the power-supplying resonator 422 is set to 10 mm, the distance C between the power-supplying resonator 422 and the power-receiving resonator 432 is set to 8 mm, and the distance B between the power-receiving resonator 432 and the power-receiving coil 431 is set to 10 mm. The resonance frequency of the power-supplying resonator 422 and the power-receiving resonator 432 is set to 15.5 MHz The power-supplying coil 421, the power-supplying resonator 422, the power-receiving resonator 432, and the power-receiving coil 431 are disposed so that the coil surfaces thereof oppose one another in a parallel manner.

As shown in FIG. 17, by using the wireless power transmission system 401 connected to the above-described network analyzer 110, the magnetic field strength distribution when the cross section D of the power-supplying resonator 422 and the power-receiving resonator 432 is viewed in the direction of the arrow S is measured. The measurement of the magnetic field strength distribution is done in the above-described inphase resonance mode and in the above-described antiphase resonance mode.

Now, the measurement result of the magnetic field strength distribution in the inphase resonance mode, which is analyzed by means of the electromagnetic field analysis and in which the magnetic field strengths are displayed in different color tones, is shown in FIG. 18(A). The magnetic field strength distribution shown in FIG. 18(A) indicates that an electromagnetic space Z451 having a relatively low (small) magnetic field strength with a reduced influence of the magnetic fields is formed along the vicinity of the outer circumference side of the power-supplying resonator 422. This electromagnetic space Z451 has a crescent shape in cross section, extending along the crescent power-supplying resonator 422.

Now, the measurement result of the magnetic field strength distribution in the antiphase resonance mode, which is analyzed by means of the electromagnetic field analysis and in which the magnetic field strengths are displayed in different color tones, is shown in FIG. 18(B). The magnetic field strength distribution shown in FIG. 18(B) indicates that an electromagnetic space Z452 having a relatively low (small) magnetic field strength with a reduced influence of the magnetic fields is formed along the power-supplying resonator 422, on the inner circumference side of the power-supplying resonator 422. This electromagnetic space Z452 clearly has a crescent shape (is a crescent-shaped cylinder) in cross section, extending along the crescent power-supplying resonator 422.

According to the examples 1 to 3 regarding a change in the shape of the electromagnetic space Z, as the power-supplying coil and the power-supplying resonator of the power-supplying module and the power-receiving coil and the power-receiving resonator of the power-receiving module are shaped in a desired manner (e.g., circular shape, rectangular shape, or crescent shape), it is possible to form an electromagnetic space Z having a relatively low magnetic field strength and having a desired shape along the shapes of the power-supplying coil and the power-supplying resonator and the power-receiving coil and the power-receiving resonator of the power-receiving module. That is to say, it is possible to change (control) the shape of an electromagnetic space Z having a relatively low magnetic field strength by changing the shapes of the power-supplying coil and the power-supplying resonator and the power-receiving coil and the power-receiving resonator of the power-receiving module.

Furthermore, according to the method above, in, for example, a wireless power transmission system, when a power-supplying module and a power-receiving module are mounted on an electronic device, a power-supplying coil and a power-supplying resonator and a power-receiving coil and a power-receiving resonator, which have having coil shapes corresponding to an electronic circuit used in the electronic device and the wireless power transmission system, are used, with the result that an electromagnetic space Z corresponding to the shape of the electronic circuit is formed. With this, the occurrence of an eddy current due to a magnetic field is more certainly and efficiently restrained or prevented for the electronic circuit, and hence the adverse effect due to heat emission is restrained.

Embodiment

Now, an application example of the method of forming the electromagnetic space Z explained in the examples above will be briefly described as an embodiment.

For example, the wireless power transmission system 101 includes, as main components, a power-supplying module 2 including a power-supplying coil 21 and a power-supplying resonator 22 and a power-receiving module 3 including a power-receiving coil 31 and a power-receiving resonator 32, the power-supplying coil 21 of the power-supplying module 2 is connected to an AC power source via an oscillation circuit configured to adjust the frequency of the power supplied to the power-supplying module 2, instead of the output terminal 111 of the network analyzer 110, and the power-receiving coil 31 of the power-receiving module 3 is connected to a rechargeable battery via a rectifier/stabilizer circuit configured to rectify the received AC power and a charging circuit configured to prevent excessive charging, instead of the input terminal 112 of the network analyzer 110.

The oscillation circuit is provided on the inner circumference side of the power-supplying resonator 22 of the power-supplying module 2, i.e., at the position where the electromagnetic space Z2 is formed, and the rectifier/stabilizer circuit is provided on the inner circumference side of the power-receiving resonator 32 of the power-receiving module 3, i.e., at the position where the electromagnetic space Z2 is formed. Note that the charging circuit and the rechargeable battery may be accommodated on the inner circumference side of the power-receiving resonator 32 of the power-receiving module 3.

The distance C between the power-supplying resonator 22 and the power-receiving resonator 32 is set to 30 mm. The power-supplying resonator 22 and the power-receiving resonator 32 are provided in proximity to each other to the extent that the electromagnetic space Z2 is formed on the inner circumference sides of the power-supplying resonator 22 and the power-receiving resonator 32. For example, the power-supplying resonator 22 and the power-receiving resonator 32 are provided in proximity to each other to the extent that the measured waveform of the transmission characteristic "S21" measured in the wireless power transmission system 101 has separate peaks; one on a low frequency side and another on a high frequency side.

Furthermore, the frequency of the AC power supplied from the AC power source to the power-supplying module 2 is set in the antiphase resonance mode by the oscillation circuit. This reduces the influence of the magnetic fields on the inner circumference sides of the power-supplying resonator 22 and the power-receiving resonator 32, with the result that an electromagnetic space Z2 having a relatively low magnetic field strength is formed. When providing the oscillation circuit and the rectifier/stabilizer circuit on the outer circumference sides of the power-supplying resonator 22 and the power-receiving resonator 32, the frequency of the AC power supplied from the AC power source to the power-supplying module 2 is set in the inphase resonance mode by the oscillation circuit. This reduces the influence of the magnetic fields on the outer circumference sides of the power-supplying resonator 22 and the power-receiving resonator 32, with the result that an electromagnetic space Z1 having a relatively low magnetic field strength is formed.

Furthermore, the distance A between the power-supplying coil 21 and the power-supplying resonator 22 and the distance B between the power-receiving coil 31 and the power-receiving resonator 32 are changeable from 20 mm to 15 mm to 10 mm to 5 mm. In the present embodiment, in order to provide the oscillation circuit on the inner circumference side of the power-supplying resonator 22 and provided the rectifier/stabilizer circuit on the inner circumference side of the power-receiving resonator 32, the distance A and the distance B are set at the minimum 5 mm to secure a relatively large electromagnetic space Z2. With this, the size of the electromagnetic space Z2 is arranged to be relatively large in accordance with the sizes of the oscillation circuit and the rectifier/stabilizer circuit.

In the wireless power transmission system 101 having the above-described structure, the AC power supplied from the AC power source to the power-supplying coil 21 via the oscillation circuit is supplied to the rechargeable battery via the rectifier/stabilizer circuit and the charging circuit, by means of the electromagnetic induction between the power-supplying coil 21 and the power-supplying resonator 22, the wireless transmission between the power-supplying resonator 22 and the power-receiving resonator 32 using the resonance (magnetic field resonant state), and the electromagnetic induction between the power-receiving resonator 32 and the power-receiving coil 31. As such, when power is supplied from the power-supplying resonator 22 to the power-receiving resonator 32 by utilizing resonance, an electromagnetic space Z2 having a relatively low magnetic field strength is formed, with reduced influence of the magnetic fields on the oscillation circuit and the rectifier/stabilizer circuit which are positioned on the inner circumference sides of the power-supplying resonator 22 and the power-receiving resonator 32. Furthermore, because each of the distance A and the distance B is set at 5 mm, the size of the electromagnetic space Z2 is relatively large in accordance with the sizes of the oscillation circuit and the rectifier/stabilizer circuit.

In addition to the above, because in the embodiment the oscillation circuit and the rectifier/stabilizer circuit, the influence of the magnetic field thereon being required to be reduced, are provided in or in the vicinity of the electromagnetic space Z2 formed on the inner circumference sides of the power-supplying resonator 22 and the power-receiving resonator 32, the occurrence of an eddy current due to the magnetic fields is restrained or prevented for the oscillation circuit and rectifier/stabilizer circuit, with the result that an adverse effect due to heat emission is restrained.

In the embodiment, furthermore, even if a metal foreign matter exists between, on the inner circumference sides of, or on the outer circumference sides of the power-supplying resonator 22 and the power-receiving resonator 32, i.e., exists at a position where the electromagnetic space Z1 or the electromagnetic space Z2 is formed, the power is efficiently and safely supplied from the power-supplying module 2 to the power-receiving module 3 by means of resonance, without the influence of the metal foreign matter on the magnetic fields.

Although the above descriptions have been provided with regard to the characteristic parts so as to understand the invention more easily, the invention is not limited to the embodiment as described above and can be applied to the other embodiments and the applicable scope should be construed as broadly as possible. Furthermore, the terms and phraseology used in the specification have been used to correctly illustrate the invention, not to limit it. In addition, it will be understood by those skilled in the art that the other structures, systems, methods and the like included in the spirit of the invention can be easily derived from the spirit of the invention described in the specification. Accordingly, it should be considered that the invention covers equivalent structures thereof without departing from the spirit and scope of the invention as defined in the following claims. In addition, it is required to sufficiently refer to the documents that have been already disclosed, so as to fully understand the objects and effects of the invention.

REFERENCE NUMERALS

2 Power-Supplying Module
3 Power-Receiving Module
21 Power-Supplying Coil
22 Power-Supplying Resonator
31 Power-Receiving Coil
32 Power-Receiving Resonator
101 Wireless Power Transmission System
110 Network Analyzer
111 Output Terminal
112 Input Terminal
Z, Z1, Z2 Electromagnetic Space

The invention claimed is:

1. A wireless power supply system comprising:
a power-supplying module including a power-supplying coil and a coil-shaped power-supplying resonator; and
a power-receiving module configured to receive power from the power-supplying resonator by means of resonance, the power-receiving module including a power-receiving coil and a coil-shaped power-receiving resonator,
at least one of members: an electronic component; a rechargeable battery; and a metal body, being provided between the power-supplying resonator and the power-receiving resonator and on inner circumference sides of the power-supplying resonator and the power-receiving resonator,
a first distance between the power-supplying coil and the power-supplying resonator and a second distance between the power-receiving coil and the power-receiving resonator being set so that when the power is supplied from the power-supplying resonator to the power-receiving resonator by means of resonance, a magnetic field space having a magnetic field strength lower than a magnetic field strength of surroundings being formed between the power-supplying resonator and the power-receiving resonator and on the inner circumference sides of the power-supplying resonator and the power-receiving resonator as magnetic fields generated around the power-supplying resonator and the power-receiving resonator cancel each other out,
the at least one of the members being disposed in the thus formed magnetic field space.

2. The wireless power supply system according to claim 1, wherein,
when the power is supplied from the power-supplying resonator to the power-receiving resonator by means of resonance, a frequency of the power supplied to the power-supplying module is set so that a direction of a current flowing in the power-supplying resonator is opposite to a direction of a current flowing in the power-receiving resonator, to form the magnetic field space.

3. A power-supplying device comprising a power supplying coil and a coil-shaped power-supplying resonator configured to supply power to a power-receiving device including a power-receiving coil and a coil-shaped power-receiving resonator by means of resonance,
at least one of members: an electronic component; a rechargeable battery; and a metal body, being provided between the power-supplying resonator and the power-receiving resonator and on inner circumference sides of the power-supplying resonator and the power-receiving resonator, and
a first distance between the power-supplying coil and the power-supplying resonator and a second distance between the power-receiving coil and the power-receiving resonator being set so that when the power is supplied from the power-supplying resonator to the power-receiving resonator by means of resonance, a magnetic field space having a magnetic field strength lower than a magnetic field strength of surroundings being formed between the power-supplying resonator and the power-receiving resonator and on the inner circumference sides of the power-supplying resonator and the power-receiving resonator as magnetic fields generated around the power-supplying resonator and the power-receiving resonator cancel each other out, the at least one of the members being disposed in the thus formed magnetic field space.

4. The wireless power supply system according to claim 3, wherein, when the power is supplied from the power-supplying resonator to the power-receiving resonator by means of resonance, a frequency of the power supplied to the power-supplying resonator is set so that a direction of a current flowing in the power-supplying resonator is opposite to a direction of a current flowing in the power-receiving resonator, to form the magnetic field space.

5. The power-supplying device according to claim 3, wherein the power-receiving device is mounted in a portable electronic device.

6. The power-supplying device according to claim 4, wherein the power-receiving device is mounted in a portable electronic device.

7. A power-receiving device comprising power-receiving coil and a coil-shaped power-receiving resonator configured to receive power from a power-supplying device including a power-supplying coil and a coil-shaped power-supplying resonator by means of resonance, at least one of members: an electronic component; a rechargeable battery; and a metal body, being provided between the power-supplying resonator and the power-receiving resonator and on inner circumference sides of the power-supplying resonator and the power-receiving resonator, and a first distance between the power-supplying coil and the power-supplying resonator and a second distance between the power-receiving coil and the power-receiving resonator being set so that when the power is supplied from the power-supplying resonator to the power-receiving resonator by means of resonance, a magnetic field space having a magnetic field strength lower than a magnetic field strength of surroundings being formed between the power-supplying resonator and the power-receiving resonator and on the inner circumference sides of the power-supplying resonator and the power-receiving resonator as magnetic fields generated around the power-supplying resonator and the power-receiving resonator cancel each other out, the at least one of the members being disposed in the thus formed magnetic field space.

8. The power-receiving device according to claim 7, wherein during the power supply from the power-supplying resonator to the power-receiving resonator by means of resonance, the magnetic field space is formed when the power having a frequency set so that a direction of a current flowing in the power-supplying resonator is opposite to a direction of a current flowing in the power-receiving resonator is supplied to the power-supplying resonator.

9. The power-supplying device according to claim 7, wherein, the power-receiving device is mounted in a portable electronic device.

10. The power-supplying device according to claim 8, wherein, the power-receiving device is mounted in a portable electronic device.

11. A method of forming an electromagnetic space, the method comprising the step of when power is supplied from a power-supplying module including a power-supplying coil and a coil-shaped power-supplying resonator to a power-receiving module including a power-receiving coil and a coil-shaped power-receiving resonator by means of resonance, setting a first distance between the power-supplying coil and the power-supplying resonator and a second distance between the power-receiving coil and the power-receiving, resonator so that a magnetic field space is formed having a magnetic field strength lower than a magnetic field strength of surroundings at a position between the power-supplying resonator and the power-receiving resonator and on inner circumference sides of the power-supplying resonator and the power-receiving resonator, as magnetic fields generated around the power-supplying resonator and the power-receiving resonator cancel each other out, at said position, at least one of members: an electronic component; a rechargeable battery; and a metal body, being provided.

12. The method according to claim 11, wherein when the power is supplied from the power-supplying resonator to the power-receiving resonator by means of resonance, a frequency of the power supplied to the power-supplying resonator is set so that a direction of a current flowing in the power-supplying resonator is opposite to a direction of a current flowing in the power-receiving resonator, to form the magnetic field space.

* * * * *